(12) United States Patent
Gazit et al.

(10) Patent No.: US 11,811,318 B2
(45) Date of Patent: Nov. 7, 2023

(54) METHOD AND APPARATUS FOR POWER CONVERSION

(71) Applicant: Solaredge Technologies Ltd., Herzeliya (IL)

(72) Inventors: Meir Gazit, Ashkelon (IL); Tzachi Glovinsky, Petah Tikva (IL); Moran Samuha, Ramat Gan (IL); Ilan Yoscovich, Ramat Gan (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/515,808

(22) Filed: Nov. 1, 2021

(65) Prior Publication Data

US 2022/0140729 A1 May 5, 2022

Related U.S. Application Data

(60) Provisional application No. 63/108,959, filed on Nov. 3, 2020.

(51) Int. Cl.
*H02M 3/158* (2006.01)
*H02M 1/00* (2006.01)
*H02J 3/38* (2006.01)

(52) U.S. Cl.
CPC ......... *H02M 3/158* (2013.01); *H02M 1/0077* (2021.05); *H02J 3/381* (2013.01); *H02J 2300/24* (2020.01)

(58) Field of Classification Search
CPC .... H02M 3/158; H02M 1/0077; H02M 1/007; H02M 1/325; H02M 3/155; H02M 7/48;
(Continued)

(56) References Cited

U.S. PATENT DOCUMENTS 10,811,975 B1 * 10/2020 Bala ...................... H02M 3/155
2010/0207455 A1 * 8/2010 Erickson, Jr. ............. G05F 1/67
307/82

(Continued)

OTHER PUBLICATIONS

Mloore B.D.: Reglerstrukturen fur batterie-betriebene Systeme, DE, vol. 43, No. 2, Jan. 25, 1994 (Jan. 25, 1994),pp. 94-100, XP000425092, ISSN: 0013-5658, pp. 99, 100: "Upside-Down Topologien"; figure 2.

(Continued)

*Primary Examiner* — John W Poos
*Assistant Examiner* — Tyler J Pereny
(74) *Attorney, Agent, or Firm* — Banner & Witcoff, Ltd.

(57) ABSTRACT

Systems, apparatuses, and methods are described for power conversion. The power conversion may be done by a plurality of power devices with different configurations. For example, the plurality of power devices may include one or more converters with an upside-up buck configuration and one or more converters with an upside-down buck configuration. The power conversion may be done by one or more power devices that may be configurable between different modes of configuration. For example, one or more power converters may be configured in either an upside-up buck configuration mode or an upside-down buck configuration mode. The selection of a certain mode of configuration of the converter may be permanent or non-permanent.

20 Claims, 33 Drawing Sheets

(58) Field of Classification Search
CPC ............ H02M 1/00; H02M 3/00; H02M 7/42; H02M 1/009; H02M 1/0074; H02M 1/008; H02M 3/1584; H02M 1/0067; H02M 1/0083; H02J 3/381; H02J 2300/24; H02J 7/0068; Y02E 10/56; H02P 2201/09
See application file for complete search history.

(56) References Cited

U.S. PATENT DOCUMENTS

| | | | | |
|---|---|---|---|---|
| 2014/0268918 A1* | 9/2014 | Gong | ................ | H02M 3/33523 363/21.15 |
| 2015/0124503 A1 | 5/2015 | Narita et al. | | |
| 2016/0226247 A1 | 8/2016 | Stratakos et al. | | |
| 2019/0245432 A1* | 8/2019 | Yan | .................... | H02M 1/4233 |
| 2020/0144825 A1* | 5/2020 | Kosugi | ..................... | H02J 1/06 |
| 2020/0212800 A1* | 7/2020 | Fan | ....................... | H02M 3/158 |

OTHER PUBLICATIONS

Huang Jen-Hung et al.: "Fast switching reconfigurable photovoltaic modules integrated within DC-DC converters", 2013 IEEE 14th Workshop on Control and Modeling for Power Electronics (Compel), IEEE, Jun. 23, 2013, pp. 1-7, XP032500865, ISSN: 1093-5142, retrieved Oct. 9, 2013, abstract; figure 1.

Sharma Ambuj et al.: "A DC-DC Bidirectional Converter with Improved Mode Transition Technique" 2018 IEEE International Conference on Power Electronics, Drives and Energy Systems (PEDES), IEEE, Dec. 18, 2018, pp. 1-6, XP033546096, retrieved on May 6, 2019, p. 2-3; figures 2-7.

Mar. 24, 2022—Extened EP Search Report—EP App. No. 21205927.3.

* cited by examiner

METHOD AND APPARATUS FOR POWER CONVERSION

BACKGROUND

Power conversion transforms energy from one form to another. One type of energy that may be converted using power conversion is electrical energy. Power conversion of electrical energy may include: changing a voltage to another voltage, changing a frequency to another frequency, converting between alternating current (AC) and direct current (DC), etc. An electrical power converter is a device used for converting electrical energy. One way of classifying power conversion is according to whether the input and output of the power converter is AC or DC. DC to DC converters may convert power from a source of DC from one voltage to another voltage, one current to another current, etc.

SUMMARY

The following summary presents a simplified summary of certain features. The summary is not an extensive overview and is not intended to identify key or critical elements.

Systems, apparatuses, and methods are described for power conversion.

In some examples, power conversion may be done by a plurality of power devices with different configurations. For example, the plurality of power devices may include one or more converters with an upside-up buck configuration and one or more converters with an upside-down buck configuration, as explained in further detail below.

In some examples, power conversion may be done by one or more power devices that may be configurable between different modes of configuration. For example, one or more power converters may be configured in either an upside-up configuration mode or an upside-down configuration mode. The setting of a certain mode of configuration of the converter may be permanent or non-permanent.

In some examples, one or more connectors may be configured to set an arrangement of a plurality of power devices. For example, one or more connectors may dictate that a first power converter with an upside-up configuration be connected to a second power converter with an upside-down configuration.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
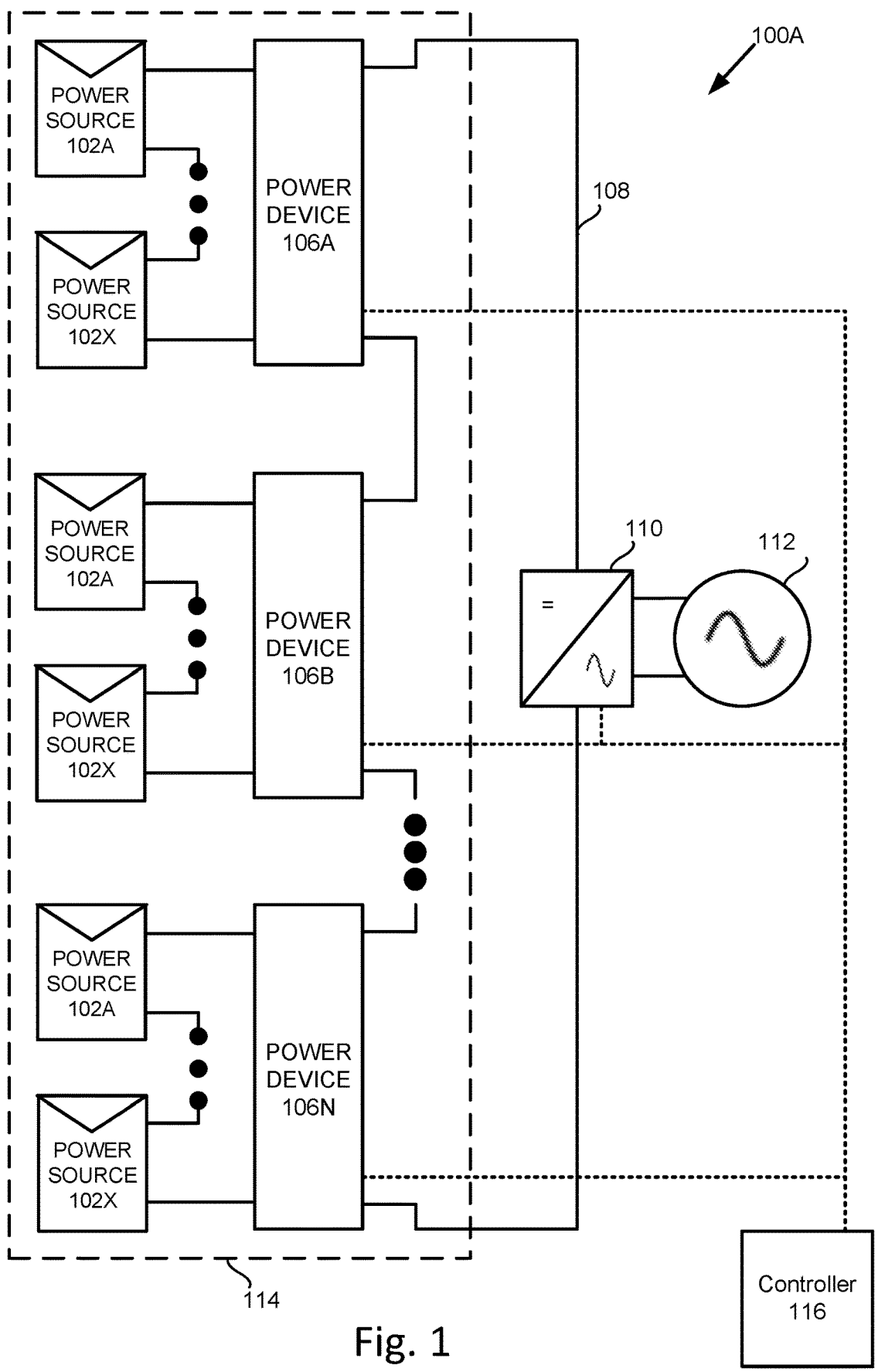
FIG. 1 shows an example power system with a single series string.

Systems, apparatuses, and methods are described herein for power conversion. In some examples, the power conversion is performed by a power system having a plurality of power devices. The plurality of power devices may be plurality of power converters. At least two of the converters may be configured in a different manner from one another. For example, at least one of the converters may be configured in an upside-up configuration and the other converter may be configured in an upside-down configuration.

The term "upside-up configuration" may refer to a configuration of a converter with a negative input terminal connected to a negative output terminal. The negative input terminal may be connected to the negative output terminal directly via a conductor, such as a wire, or via a switch that is acting as a permanent direct connection. For example, when the power device is in an upside-up configuration mode, then the switch may be acting like a conductor, such as a wire. The negative input terminal may have substantially the same electrical potential as the negative output terminal. The converter may be any appropriate converter. For example, the converter may be at least one of the following converters: buck, boost, buck/boost, buck+boost, flyback, etc. The term "upside-up buck configuration" used herein may refer to a buck converter in an "upside-up configuration" (e.g., a configuration of a buck converter with a negative input terminal connected to a negative output terminal). A converter in the upside-up buck configuration may also be referred to as: upside-up buck converter, regular buck converter, positive buck converter, buck converter, etc.

The term "upside-down configuration" may refer to a configuration of a converter with a positive input terminal connected to a positive output terminal. The positive input terminal may be connected to the positive output terminal directly via a conductor, such as a wire, or via a switch that is acting as a permanent direct connection. For example, when the power device is in an upside-down configuration mode, then the switch may be acting like a conductor, such as a wire. The positive input terminal may have substantially the same electrical potential as the positive output terminal. As mentioned above, the converter may be any appropriate converter. For example, the converter may be at least one of the following converters: buck, boost, buck/boost, buck+ boost, flyback, etc. The term "upside-down buck configuration" used herein may refer to a buck converter in an "upside-down configuration" (e.g., a configuration of a buck converter with a positive input terminal connected to a positive output terminal). A converter in the upside-down buck configuration may also be referred to as: upside-down buck converter, mirror configuration buck converter, mirror image buck converter, inverted buck converter, negative buck converter, floating buck converter, Vin reference buck converter, etc. The terms "positive" and "negative" used herein may relate to different electrical potential levels. The term "positive" may refer to a higher potential level, and the term "negative" may refer to a lower potential level. For example, a "positive" potential may refer to a potential that is higher than a ground or reference potential, while a "negative" potential may refer to a potential that is lower than the ground or reference potential. Both "positive" potential and "negative" potential may refer to substantially non-zero potential levels.

In some examples a power system may include a plurality of upside-up converters and/or a plurality of upside-down converters. For example, there may be a 1:1 ratio of upside-up converters to upside-down converters. The ratio may also be nearly 1:1 with a tolerance of one or more for that ratio. For example, the power system may include four upside-up buck converters and five upside-down buck converters, or three upside-up buck converters and four upside-down buck converters, etc. In other examples there may be other ratios of upside-up converters to upside-down converters. One or more of the upside-up buck converters may be connected to the upside-down buck converters. For example, the converters may be connected in series with an output of one of the converters being connected to the output of another converter. In some examples, a positive output terminal of one converter may be connected to a negative output terminal of another, different converter. One or more of the converters may be connected to a DC bus. For example, an output of one converter may be connected to the high side of a DC bus, and an output of another converter may be connected to the low side of a DC bus. As an example, an upside-down buck converter may be connected to the high side of a DC bus to tie the voltage at the positive input terminal of the converter to a voltage at the high side of the DC bus. Tying the voltage at the positive input terminal of the converter to the voltage at the high side of the DC bus may cause the voltage at the positive input terminal to be approximately equal to the voltage at the high side of the DC bus. This tying may be done to set the voltage at the positive input terminal of the converter according to the voltage at the high side of the DC bus. As another example, an upside-up buck converter may be connected to the low side of the DC bus to tie the voltage at the negative input terminal of the converter to a voltage at the low side of the DC bus. Tying the voltage at the negative input terminal of the converter to the voltage at the low side of the DC bus may cause the voltage at the negative input terminal to be about equal to the voltage at the low side of the DC bus. This tying may be done to set the voltage at the negative input terminal of the converter according to the voltage at the low side of the DC bus. Setting the voltage at the input terminal of one or more converters may be done to control a voltage across the one or more converters. For example, setting the voltage according to the high side and low side of the DC bus may be done to keep a total voltage across the converters within a threshold voltage.

In some examples, one or more converters of the plurality of converters may be switched between different modes, so that the configuration of the converter may be changed. For example the configuration of the converter may be changed to: an upside-up configuration mode, an upside-down configuration mode, etc. As an example, the configuration of the converter may be set in response to one or more signals. The one or more signals may include one or more instructions related to setting the mode of configuration of the converter.

In some examples, the plurality of converters may include one or more connectors that force a certain arrangement. For example, an upside-up output may only be connected to an upside-down input, and an upside-down output may only be connected to an upside-up input, etc.

The accompanying drawings, which form a part hereof, show examples of the disclosure. It is to be understood that the examples shown in the drawings and/or discussed herein are non-exclusive and that there are other examples of how the disclosure may be practiced.

It is noted that the teachings of the presently disclosed subject matter are not bound by the systems and apparatuses described with reference to the figures. Equivalent and/or modified functionality may be consolidated or divided in another manner and may be implemented in any appropriate combination. For example, power source 102A and power source 102X, which are shown as separate units (shown, for example, in FIG. 1), may have their functionalities and/or components combined into a single unit.

It is also noted that the teachings of the presently disclosed subject matter are not bound by the flow charts shown in the figures, and the shown operations may occur out of the shown order. For example, operations that are shown in succession may be executed substantially concurrently or in reverse order. It is also noted that while the flow charts are described with reference to elements shown herein, this is by no means binding, and the operations may be performed by elements other than those described herein.

It is also noted that like references in the various figures refer to like elements throughout the application. Similar reference numbers may also connote similarities between elements. For example, it is to be understood that power device 106A shown in FIG. 1 may be similar to, or the same as, other power devices described and shown herein, and vice versa. Throughout the application certain general references may be used to refer to any of the specific related elements. For example, power source 102 may refer to any of the various power sources, power device 106 may refer to any of the various power devices, power system 100 may refer to any of the various power systems, etc.

It is also noted that all numerical values given in the examples of the description are provided for purposes of example only and are by no means binding.

The terms "substantially" and "about" are used herein to indicate variations that are equivalent for an intended purpose or function (e.g., within a permissible variation range). Certain values or ranges of values are presented herein with numerical values being preceded by the terms "substantially" and "about". The terms "substantially" and "about" are used herein to provide literal support for the exact number that it precedes, as well as a number that is near to or approximately the number that the term precedes. In determining whether a number is near to or approximately a specifically recited number, the near or approximating un-recited number may be a number, which, in the context in which it is presented, provides a substantial equivalent of the specifically recited number.

The term "controller" used herein may include a computer and/or other appropriate processing circuitry and memory. The terms "computer" or "processor" or variations thereof should be expansively construed to cover any kind of hardware-based electronic device with data processing capabilities including, by way of non-limiting example, a digital processing device (e.g., digital signal processor (DSP), microcontroller, field programmable circuit, application-specific integrated circuit (ASIC), etc.), a device which comprises or is operatively connected to one or more processing devices, and/or an analog circuit implementing control logic. The terms "memory" or "data storage device" used herein should be expansively construed to cover any volatile or non-volatile computer memory suitable to the presently disclosed subject matter. The above may include, by way of non-limiting example, the one or more controllers 116 disclosed in the present application.

Figure 2:
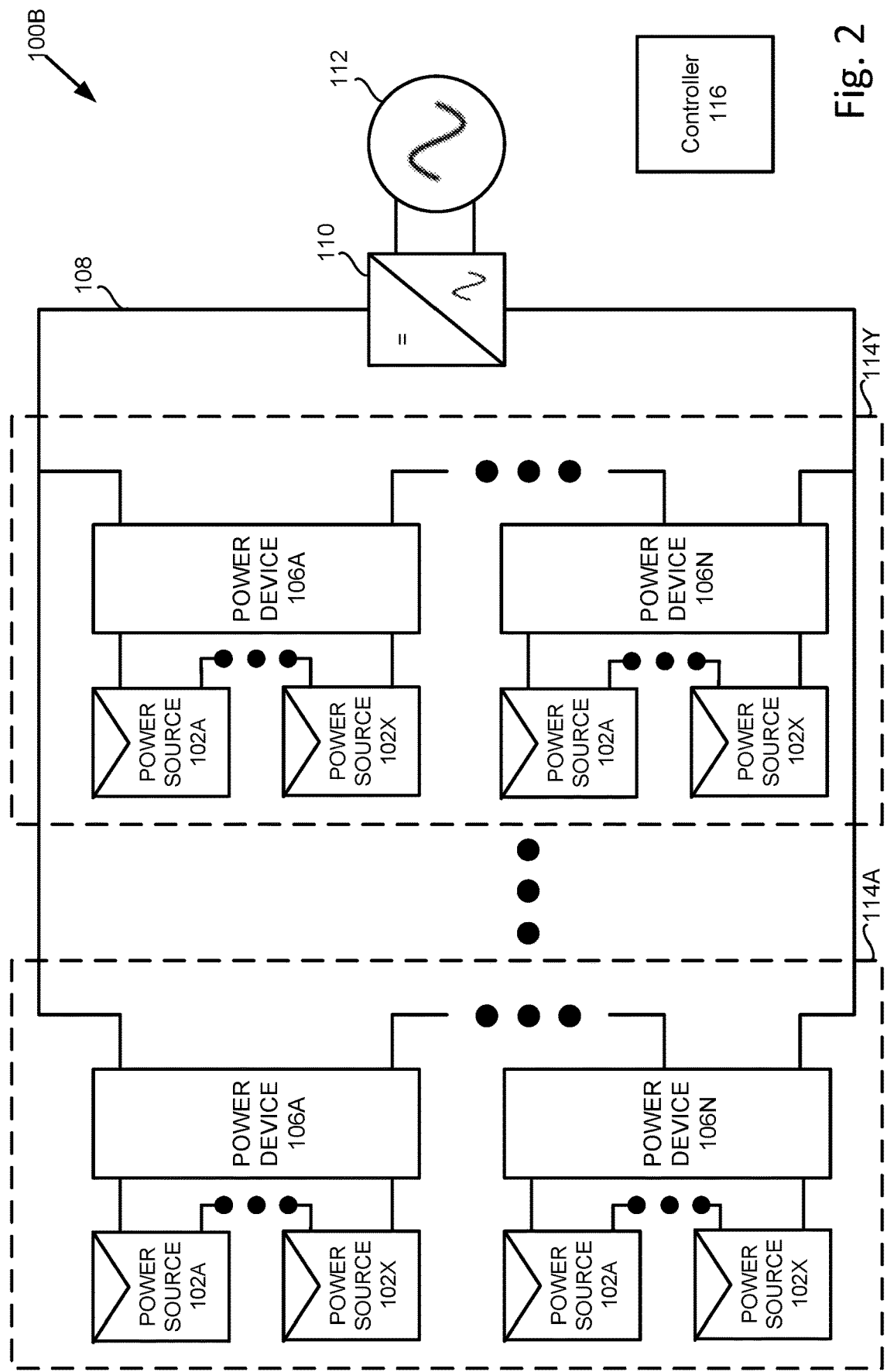
FIG. 2 shows an example power system with a plurality of series strings.

FIG. 1 and FIG. 2 show examples of various power systems 100 with power devices 106 according to examples of the present subject matter.

Figure 6:
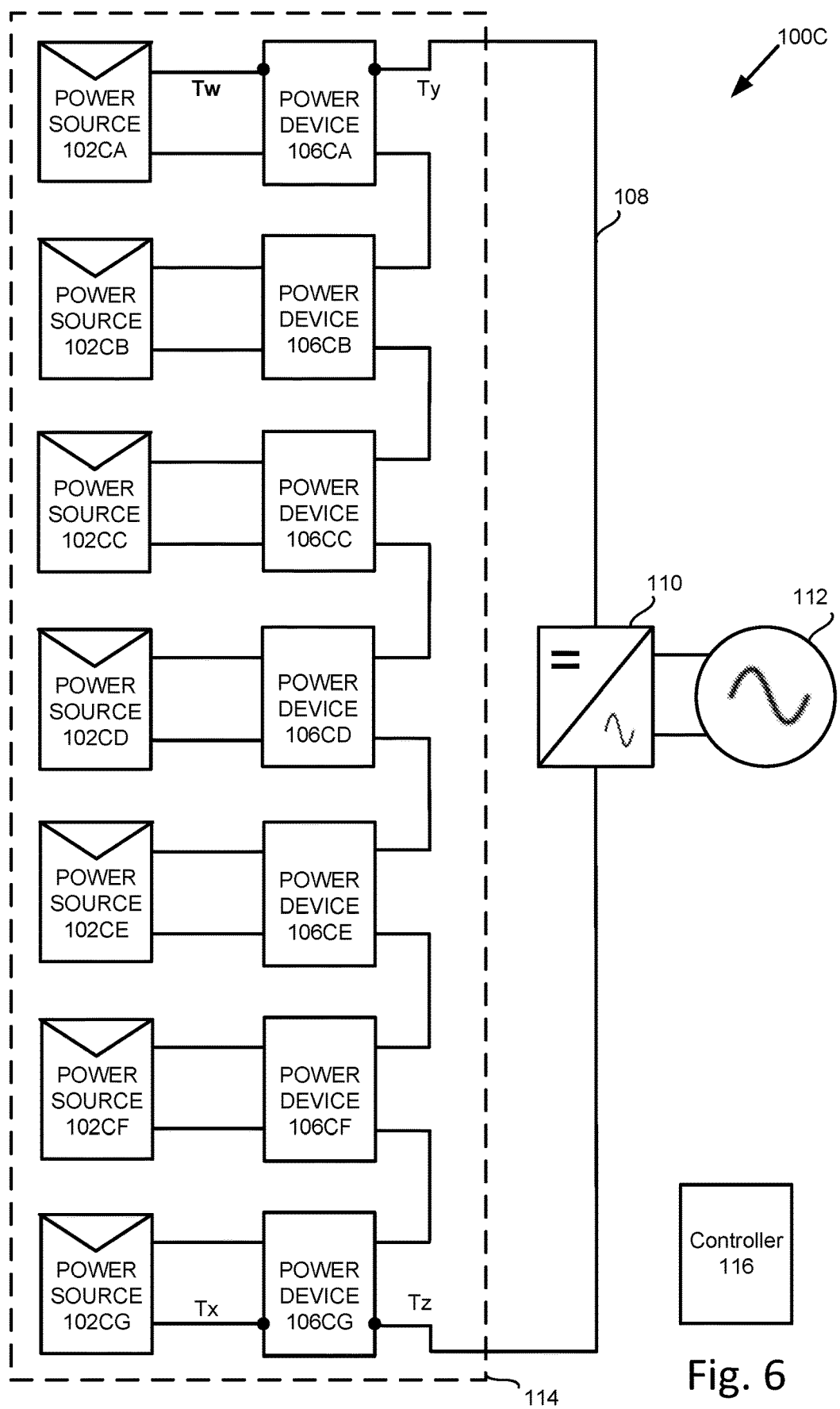
FIG. 6 shows an example power system.

Reference is now made to FIG. 1, which shows a power system 100A according to examples of the present subject matter. Power system 100A may include a plurality of power devices 106A, 106B . . . 106N, where N is any appropriate number. The term "appropriate" as used here may include variations that are within a permissible range of variations such that they provide an equivalent purpose or function. For example, 106N may refer to 1, 3, 5, 15, or 40 additional power devices beyond power devices 106A and 106B. Power devices 106A, 106B . . . 106N are also referred to herein as "power devices 106", and a respective power device of power devices 106 is also referred to herein as "power device 106". Each power device 106 may be connected to one or more power sources 102A . . . 102X, where X is any appropriate number. Each power device (e.g., power device 106A, power device 106B . . . ) may have a different number of attached power sources 102A . . . 102X. The one or more power sources 102A . . . 102X are also referred to herein as "power sources 102", and a respective power source of power sources 102 is also referred to herein as "power source 102". In some examples, a single power source 102 may be connected to a respective single power device 106 (as shown in FIG. 6).

As an example, power system 100A may be a photovoltaic (PV) power system, and power sources 102 may be PV generators. For example, power sources 102 may be one or more photovoltaic cells, strings of substrings of photovoltaic cells, or strings of photovoltaic panels. Although power sources are described herein in the context of PV generators, it will be appreciated that the term power source may include other types of appropriate power sources, such as wind turbines, hydro-turbines, fuel cells, or batteries.

When the one or more power sources 102A . . . 102X connected to a particular power device 106 are a plurality of power sources 102, then the plurality of power sources 102 may be connected to the respective power device 106 in series, parallel, or any other suitable arrangement with respect to each other. Each power device 106 may include a plurality of terminals configured to connect the power sources 102 to the power device 106.

The power devices 106 may include one or more converters. For example, the power devices 106 may include one or more DC to DC converters. As mentioned above, the one or more converters may include, for example, one or more: buck converters, boost converters, buck/boost converters, buck+boost converters, flyback converters, etc. At least one of the power devices 106 may be in an upside-up configuration, and at least one other of the power devices 106 may be in an upside-down configuration. At least one of the power devices 106 may be configurable in either an upside-up configuration mode or an upside-down configuration mode, as explained in further detail below.

In some examples, one or more power devices 106 of a first type or operating in a first mode may be connected to one or more other power devices 106 of a second type or operating in a second mode (e.g., to cause a voltage of the power system 100A to remain below a threshold). For example, power device 106A may be an upside-down buck connected to power device 106B which may be an upside-up buck. Power device 106N may be an upside-up buck connected to a different upside-down buck. In some examples, a plurality of power devices 106 of the same type or mode may be connected to each other. For example, power device 106A may be an upside-down buck connected to power device 106B which may also be an upside-down buck. Power device 106N may be an upside-up buck between a different upside-up buck and the low side of a DC bus (e.g., bus 108).

In some examples, one or more power devices 106 may be configurable to change mode, either reversibly or permanently. For example, power device 106A may be configured in an upside-down buck configuration mode, power device 106B may be configured in an upside-down buck configuration mode, and power device 106N may be configured in an upside-up buck configuration mode. As an example, such as if power device 106A and power device 106B are malfunctioning or non-operational, power device 106N may change modes of operation and operate in an upside-down buck configuration mode of operation. The power device 106 may be configured to operate in one of the different modes of operation in response to one or more obtained signals, or in response to one or more determinations made based one or more obtained parameters.

In some examples, one or more connectors may be arranged to determine the arrangement of one or more elements of the power system 100A. For example, one or more connectors may be configured to cause a terminal of a certain power device 106 to be connected to a terminal of a different power device 106, or a terminal of the power device 106 to be connected to a high side or a low side of a DC bus. In some examples, one or more connectors may be configured to connect a positive output terminal (e.g., of a certain power device 106) to a negative output terminal (e.g., of a different power device 106). As an example, one connector may be configured to connect the negative output of an upside-up converter to the positive output of an upside-down converter, and not to the positive output of an upside-up converter. Another connector may be configured to connect the negative output of an upside-down converter to the positive output of an upside-up converter to the positive output of an upside-down converter. As another example, one connector may be configured to connect the negative output of an upside-up converter to the low side of a DC bus, and not to the high side of the DC bus. Another connector may be configured to connect the positive output of an upside-down converter to the high side of a DC bus, and not to the low side of the DC bus.

In some examples, one or more elements of the power system 100A may be prewired or have fixed connections to determine the arrangement of the system. For example, one or more upside-up buck converters may be prewired and connected to one or more upside-down buck converters.

The power devices 106 may be connected to one or more system power devices 110. The power devices 106 may be connected to one another in series or in parallel. For example, the power devices 106 may be connected to one another at their outputs, with at least one output terminal of a first power device being connected to at least one other output terminal of a second power device. The power devices 106 are shown in FIG. 1 as being connected in a series connection forming a series string 114 of power devices. However, other arrangements are possible. For example, power devices 106 may be connected in parallel (e.g., a plurality of positive outputs of the power devices 106 may be connected, and a plurality of negative outputs of the power devices 106 may be connected). Series string 114 may be connected to the one or more system power devices 110 (e.g., at one or more outputs) via a bus 108 (e.g., a DC bus). DC bus 108 may have a high side connected to the positive input of system power device 110, and a low side connected to the negative input of system power device 110. In the example of FIG. 1, power device 106A may be connected to the high side of DC bus 108 at the "top" of series string 114. Power device 106N may be connected to the low side of DC bus 108 at the "bottom" of series string 114. In an example where power device 106A is bypassed (such as when power device 106A is not producing power or producing power below a certain threshold), then power device 106B may be said to be operating as the "top" power device of series string 114.

The one or more system power devices 110 may be, for example, one or more: DC to DC converters (e.g., buck converters, boost converters, buck/boost converters, buck+ boost converters, etc.), DC to AC inverters, combiner and/or monitoring boxes, etc. The one or more system power devices 110 may be an inverter for one or more phases (e.g., one phase inverter, two phase inverter, three phase inverter, etc.), and may include lines or phases that are not shown herein for the sake of simplicity.

The one or more system power devices 110 may be connected to one or more loads 112. The one or more loads 112 may include, for example, one or more: electrical grids (e.g., AC electrical grid), storage devices (e.g., batteries), resistive devices (e.g., resistors), AC devices (e.g., motors), etc.

Power system 100A may include one or more controllers 116. The one or more controllers 116 may be configured to transmit and receive one or more signals. The one or more signals may be transmitted/received between different controllers 116, or between one or more controllers 116 and one or more other elements of power system 100A. The one or more signals may include one or more instructions related to power conversion. The one or more instructions may instruct the power devices 106, and/or the one or more system power devices 110, to perform functionality consisted with the methods and systems described herein. One or more of the controllers 116 may be designated as a master controller. In some instances, one or more of the power devices 106 may comprise one or more internal controllers 116 (which may replace, or supplement, one or more external controllers 116), and one or more of those internal controllers 116 may be designated as the master controller. For simplicity, FIG. 1 shows controller 116 as a central controller external to power devices 106 and the one or more system power devices 110. However, further to the above, it should be understood that any appropriate number of controllers 116 may exist, and one or more of the one or more controllers 116 may be fully or partially implemented in one or more power devices 106.

The one or more controllers 116 may include processing circuits and memory. The one or more controllers 116 may be configured to access data and make determinations.

One or more sensors may be configured to obtain one or more parameters and/or parameter data related to power system 100A. For example, the one or more sensors may be configured to detect a physical phenomenon and determine a digital value or parameter representing the intensity of the phenomenon. The value or parameter may be transmitted to one or more controllers 116. In some examples, the value or parameter may be further processed (e.g., into parameter data). These value or parameter may be an electrical parameter, such as a: current, voltage, power, temperature, irradiance, etc.

As mentioned above, the one or more controllers 116 of power system 100A may be configured to transmit or receive instructions (e.g., as signals) to or from one or more other elements of the power system. In some examples, power devices 106, system power devices 110, and/or one or more sensors may be communicatively and/or operably connected to the one or more controllers 116. These connections are shown in FIG. 1 as dashed lines. For example, the one or more sensors may provide data to the one or more controllers 116. Further, controllers 116 may be connected to any other component of power system 100A, such as the system power devices 110, load 112, power sources 102, etc.

FIG. 2 shows a power system 100B according to examples of the present subject matter. Power system 100B may be similar to other power systems 100 shown and described herein. For example, power system 100B may comprise the same components as power system 100A, wherein one or more additional series strings of power devices 106 are connected in parallel. Series strings 114A . . . 114Y of power devices 106 may be connected in parallel via the bus 108. Y may be any appropriate number. The plurality of series strings 114A . . . 114Y may be connected to the one or more system power devices 110 via the bus 108. Each series string 114A . . . 114Y may include one or more power devices 106A . . . 106N that have one or more power sources 102A . . . 102X, connected to them. N may be a different number for each set of power devices 106A . . . 106N. X may be a different number for each set of power sources 102A . . . 102X.

Figure 3A:
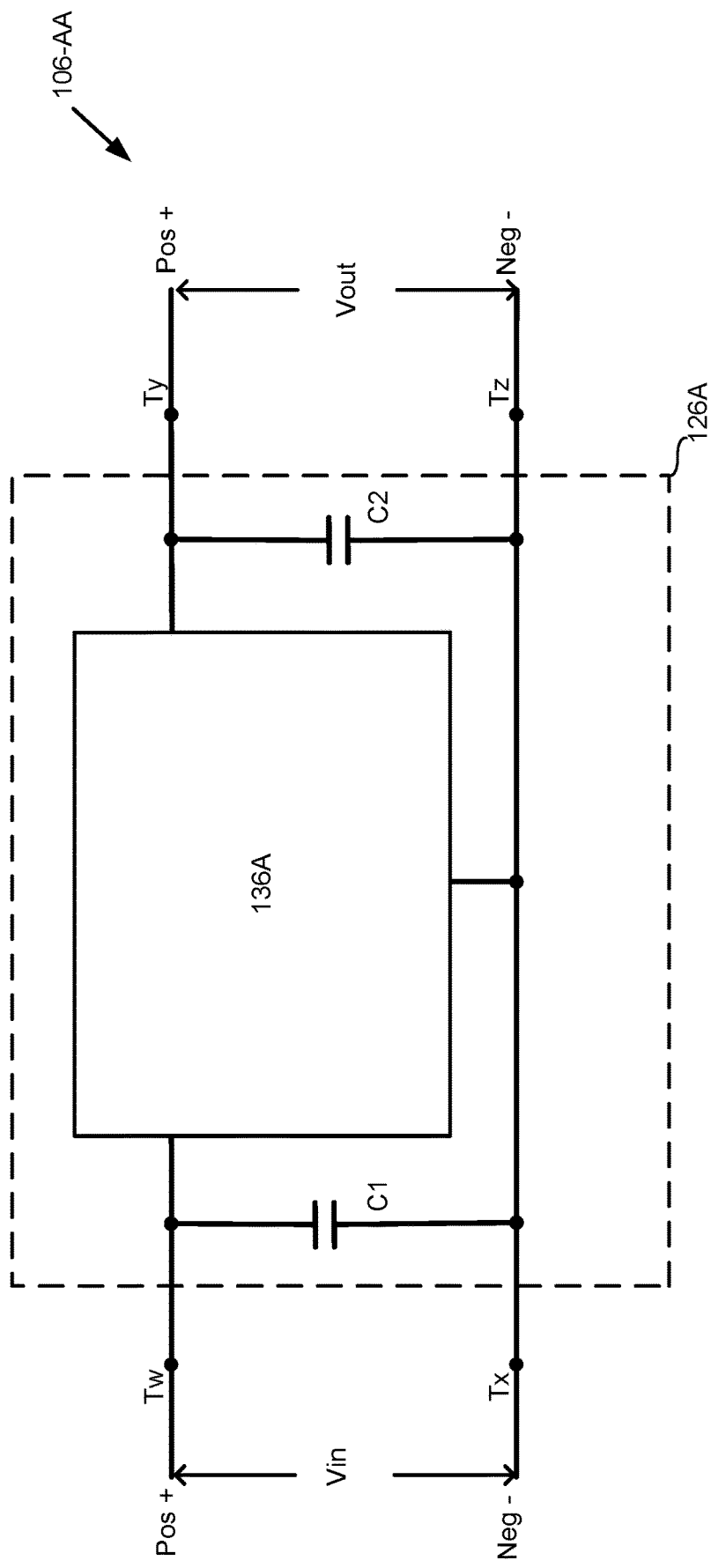
FIG. 3A shows an example power device with an upside-up configuration.

FIG. 3A to FIG. 5 show examples of various power devices 106 (e.g., a power device 106A, 106B, or 106N) according to examples of the present subject matter. The power devices 106 shown in FIG. 3A to FIG. 5 may be part of the various power systems 100 shown in the figures and described herein (e.g., power system 100A or power system 100B). FIG. 3A and FIG. 3B show examples of power devices 106 with an upside-up configuration, according to examples of the present subject matter.

Reference is now made to FIG. 3A, which shows a power device 106-AA. Power device 106-AA is shown as a converter in an upside-up configuration. Power device 106-AA is configured to receive power on a first plurality of terminals and to output power on a second plurality of terminals. Power device may include circuitry 126A connected between the first plurality of terminals and the second plurality of terminals. Circuitry 126A may include conversion circuitry 136A, an input capacitor C1, and/or an output capacitor C2. The first plurality of terminals may include a first input terminal Tw and a second input terminal Tx. Input terminals Tw and Tx may receive an input voltage Vin from one or more respective power sources 102 (e.g., the one or more power sources in FIG. 1 and FIG. 2). The second plurality of terminals may include a first output terminal Ty and a second output terminal Tz. Output terminals Ty and Tz may provide a second output voltage Vout. Output voltage Vout may be converted from the input voltage Vin by converter circuitry 136. Converter circuitry 136A may be any appropriate converter circuitry. For example, converter circuitry 136A may be: buck circuitry, boost circuitry, buck/boost circuitry, buck+boost circuitry, etc. An example of buck circuitry may be shown in FIG. 3B. Power device 106-AA may be a converter in an upside-up configuration with negative input terminal Tx directly connected to negative output terminal Tz.

Figure 3B:
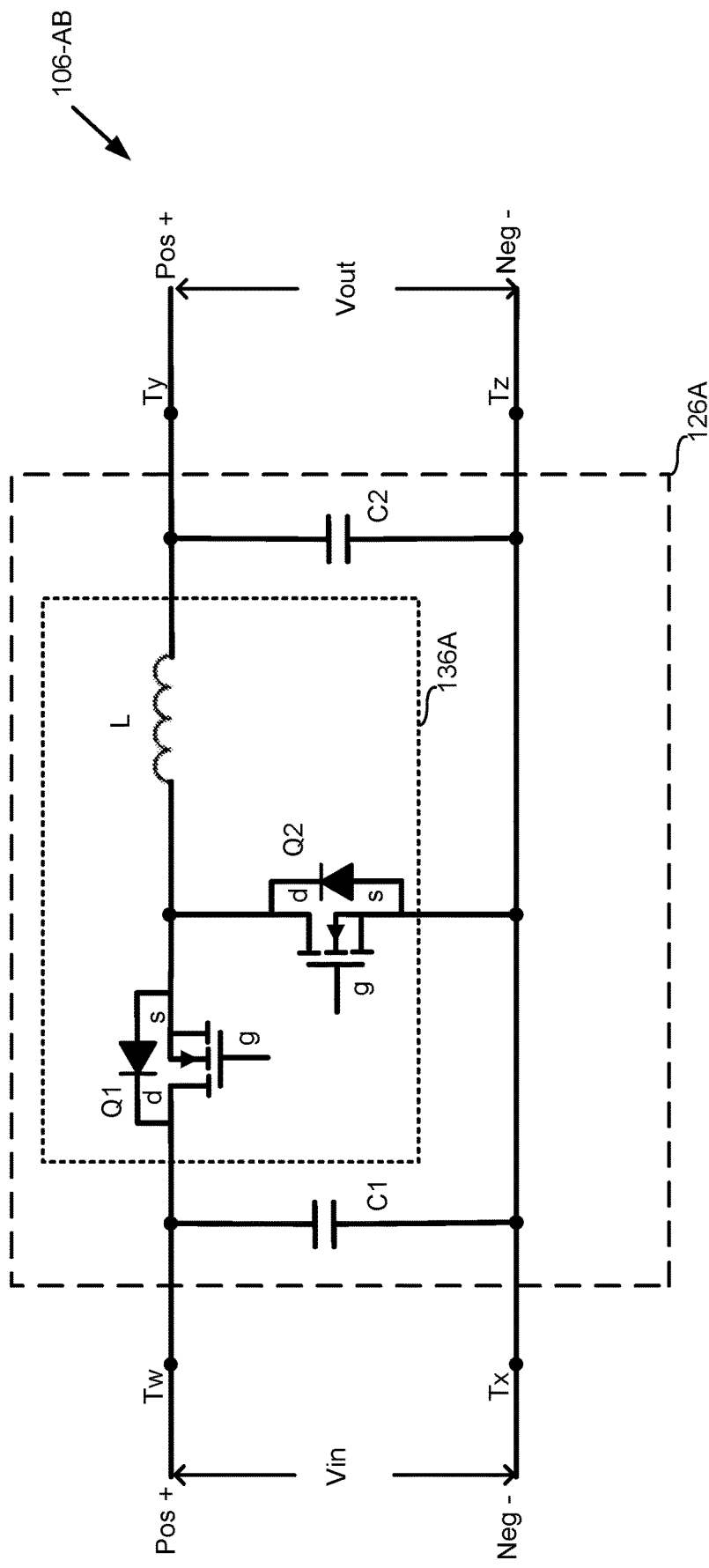
FIG. 3B shows an example power device with an upside-up buck configuration.

Reference is now made to FIG. 3B, which shows a power device 106-AB. FIG. 3B shows an example upside-up buck configuration. Power device 106-AB may be a DC to DC buck converter in an upside-up buck configuration. The buck converter, which may also be referred to as a step-down converter, may be a DC to DC power converter that steps down the input voltage Vin across the input terminals Tw and Tx to a reduced output voltage Vout across output terminals Ty and Tz. The buck converter may convert an input current flowing between the input terminals Tw and Tx to an increased output current flowing between the output terminals Ty and Tz.

In the example of FIG. 3B, the first input terminal Tw may be connected to the drain (d) of a first switch Q1. The first input terminal Tw may be connected to a first terminal of an input capacitor C1. The second input terminal Tx may be connected to a second terminal of the input capacitor C1, the source (s) of a second switch Q2, a first terminal of an output capacitor C2, and/or the second output terminal Tz. The drain (d) of the second switch Q2 may be connected to the source (s) of the first switch Q1, and/or to a first terminal of an inductor L. A second terminal of the inductor L may be connected to a second terminal of output capacitor C2, and/or the first output terminal Ty. In some examples one or more bypass diodes may be connected in parallel with output capacitor C2. The bypass diode may be configured to bypass the output of power device 106-AB. One or more body diodes (e.g., the body diode of switch Q2) may be configured to operate as bypass diodes to bypass the output of power device 106-AB.

In FIG. 3B, the input terminal Tx may be directly connected to the output terminal Tz. The input terminal Tx may have substantially the same voltage as the output terminal Tz. The positive output terminal of a power source may be connected to input terminal Tw and the negative output terminal of the power source may be connected to input terminal Tx. The positive output terminal Ty may be connected to a positive input terminal of a load, or may be connected to another power device that is connected to power device 106-AB. The negative output terminal Tz may be connected to a negative input terminal of a load, or may be connected to an input terminal of another power device that is connected to power device 106-AB (e.g., in series or parallel). One or more of the output terminals Ty and Tz may be connected to a DC bus. The input terminal Tx may be electrically similar to output terminal Tz. The negative input terminal Tx may be directly connected to the negative output terminal Tz.

One or more of switches Q1 and Q2, may be, for example: a field effect transistor (FET), a metal-oxide-semiconductor field-effect transistor (MOSFET), a bipolar junction transistor (BJT), an insulated-gate bipolar transistor (IGBT), a silicon carbide (SiC) switch, a gallium nitride (GaN) switch, etc. Switches Q1 and Q2 may be active switches (e.g., MOSFETs where switch Q1 is controlled to be ON when switch Q2 is OFF, or vice versa), relays, and/or the like. In some examples, switch Q2 may be replaced with a diode corresponding to the parasitic diode which may be shown as part of switch Q2.

Figure 4A:
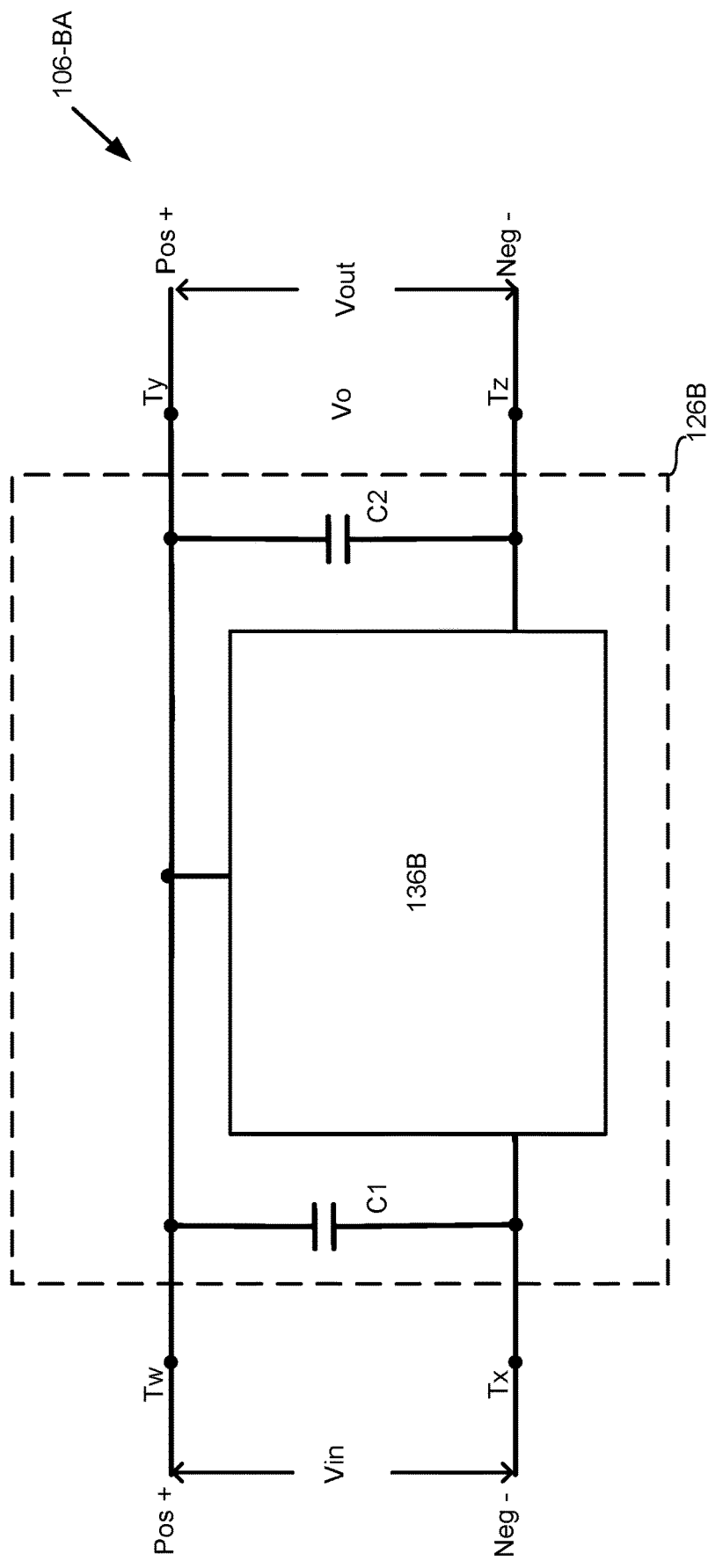
FIG. 4A shows an example power device with an upside-down configuration.
Figure 4B:
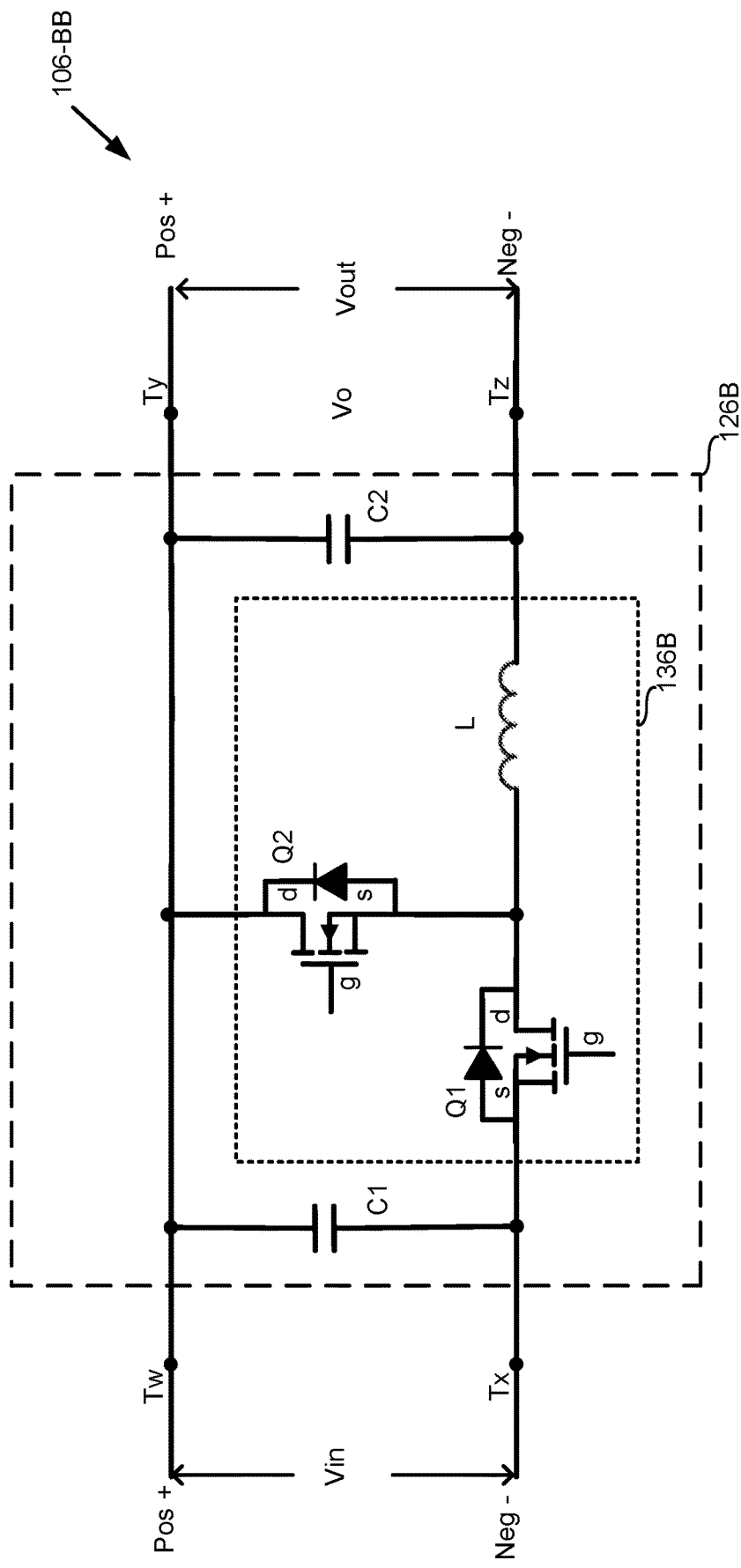
FIG. 4B shows an example power device with an upside-down buck configuration.

FIG. 4A and FIG. 4B show examples of power devices 106 with an upside-down configuration.

Reference is now made to FIG. 4A, which shows an example power device 106-BA. Power device 106-BA may be a converter in an upside-down configuration. Power device 106-BA may be configured to receive power on a first plurality of terminals and to output power on a second plurality of terminals. Power device may include circuitry 126B connected between the first plurality of terminals and the second plurality of terminals. Circuitry 126B may include conversion circuitry 136B, an input capacitor C1, and/or an output capacitor C2. The first plurality of terminals may include a first input terminal Tw and a second input terminal Tx. Input terminals Tw and Tx may receive an input voltage Vin from one or more respective power sources 102 (e.g., the one or more power sources in FIG. 1 and FIG. 2). The second plurality of terminals may include a first output terminal Ty and a second output terminal Tz. Output terminals Ty and Tz may provide a second output voltage Vout. Output voltage Vout may be converted from the input voltage Vin by converter circuitry 136B. Converter circuitry 136B may be any appropriate converter circuitry. For example, converter circuitry 136B may be: buck circuitry, boost circuitry, buck/boost circuitry, buck+boost circuitry, etc. Power device 106-BA may show positive input terminal Tw directly connected to positive output terminal Ty.

Reference is now made to FIG. 4B, which shows a power device 106-BB. Power device 106-BB may be a DC to DC buck converter in an upside-down buck configuration. The first input terminal Tw may be connected to the first terminal of the input capacitor C1, the drain (d) of the second switch Q2, the first terminal of the output capacitor C2, and/or the first output terminal Ty. The second input terminal Tx may be connected to the source (s) of the first switch Q1. The second input terminal Tx may be connected to the second terminal of the input capacitor C1. The drain (d) of the first switch Q1 may be connected to the source (s) of the second switch Q2, and/or to the first terminal of the inductor L. The second terminal of the inductor L may be connected to the second terminal of output capacitor C2, and/or the second output terminal Tz. One or more bypass diodes may be connected in parallel with output capacitor C2. The one or more bypass diodes may be configured to bypass the output of power device 106-BB. One or more body diodes (e.g., the body diode of switch Q2) may be configured to operate as bypass diodes to bypass the output of power device 106-BB.

Referring to FIG. 4B, the input terminal Tw may be directly connected to the output terminal Ty. The input terminal Tw may have substantially the same voltage as the output terminal Ty. The positive output terminal of the power source may be connected to input terminal Tw and the negative output terminal of the power source may be connected to input terminal Tx. The positive output terminal Ty may be connected to a positive input terminal of a load, and/or connected to another power device that is connected to power device 106-BB (e.g., in series or parallel). The negative output terminal Tz may be connected to a negative input terminal of a load, and/or connected to an input terminal of another power device that is connected to power device 106-BB (e.g., in series or parallel). One or more of the output terminals Ty and Tz may be connected to a DC bus. The input terminal Tw may be electrically similar to output terminal Ty. The positive input terminal Tw may be directly connected to the positive output terminal Ty.

Figure 5:
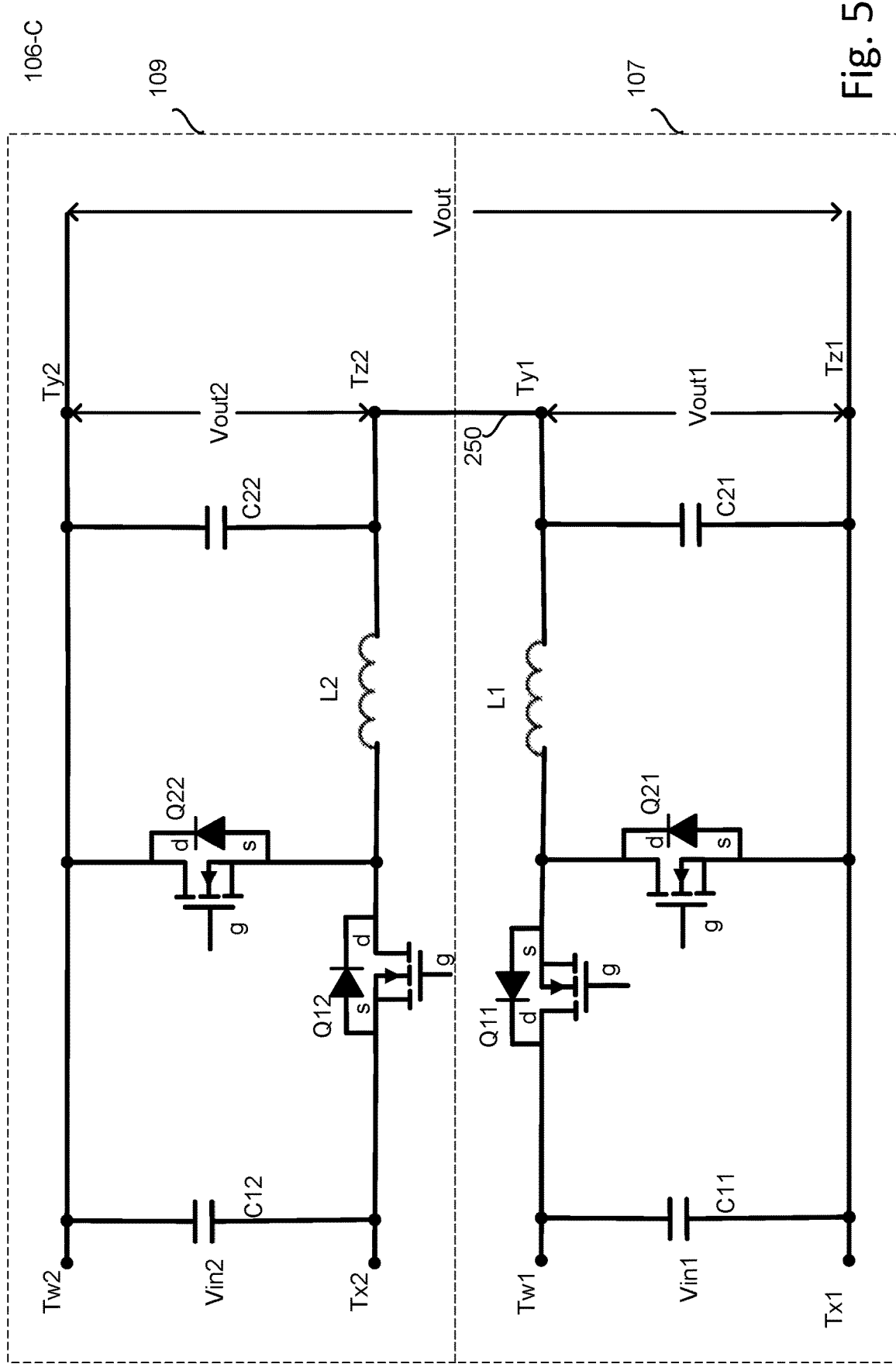
FIG. 5 shows an example power device.

FIG. 5 shows an example power device 106-C. Power device 106-C may include an upside-up buck converter 107, and/or an upside-down buck converter 109. Upside-up buck converter 107 and upside-down buck converter 109 may be combined as sub-converters in a single shared housing of power device 106-C. Alternatively, upside-up buck converter 107 and upside-down buck converter 109 may be provided as separate power devices in separate housings of power device 106-C.

Referring to FIG. 5, upside-up buck converter 107 may have an upside-up buck configuration and upside-down buck converter 109 may have an upside-down buck configuration (as may be described with relation to FIG. 3B and FIG. 4B). One or more bypass diodes may be included in the power device 106-C. Upside-up buck converter 107 and upside-down buck converter 109 are shown in FIG. 5 as being connected with a series connection, but other connections (such as parallel connections) are possible. In the series connection an output terminal Ty1 of upside-up buck converter 107 may be connected to an output terminal Tz2 of upside-down buck converter 109 via connection 250. The total output voltage Vout of the series connection of upside-up buck converter 107 and upside-down buck converter 109 is denoted as Vout in FIG. 5. The total output voltage Vout may be the combination of the output voltage Vout1 of the upside-up buck converter 107 and the output voltage Vout2 of the upside-down buck converter 109. The total output voltage Vout may be about equal to the sum of output voltage Vout1 and output voltage Vout2.

Vout may be connected to a system power device 110. For example, output terminal Ty2 may be connected to a first input terminal of a system power device 110 and output terminal Tz1 may be connected to a second input terminal of the system power device 110. Output terminal Ty2 may be connected to a positive input terminal of the system power device 110 and output terminal Tz1 may be connected to a negative input terminal of system power device 110. In some examples system power device 110 may be configured to set a value for Vout (e.g., by controlling one or more electrical parameters, such as a voltage, current, or power, which may be related to the power system 100).

Connecting the upside-up buck converter 107 and upside-down buck converter 109 in series may cause the voltage at input terminal Tw2 to be below a threshold voltage. For example, when the series of converters 107 and 109 are connected across the input terminals of a system power device 110, the voltage at input terminal Tw2 may be tied to the voltage on the high side of a DC bus 108. Further examples may be given below with reference to FIG. 7B.

Power devices 106 shown herein may have shared common elements. For example, in some examples inductor L1 and inductor L2 shown in FIG. 5 may be a shared inductor that is shared by a plurality of power devices (e.g., power device 107 and power device 109). The shared inductor may include at least a portion that is wound around a single shared core. In some examples, the power devices 106 may have one or more shared capacitors. For example, a plurality of power devices may have a common shared input capacitor or a common shared output capacitor.

Figure 7A:
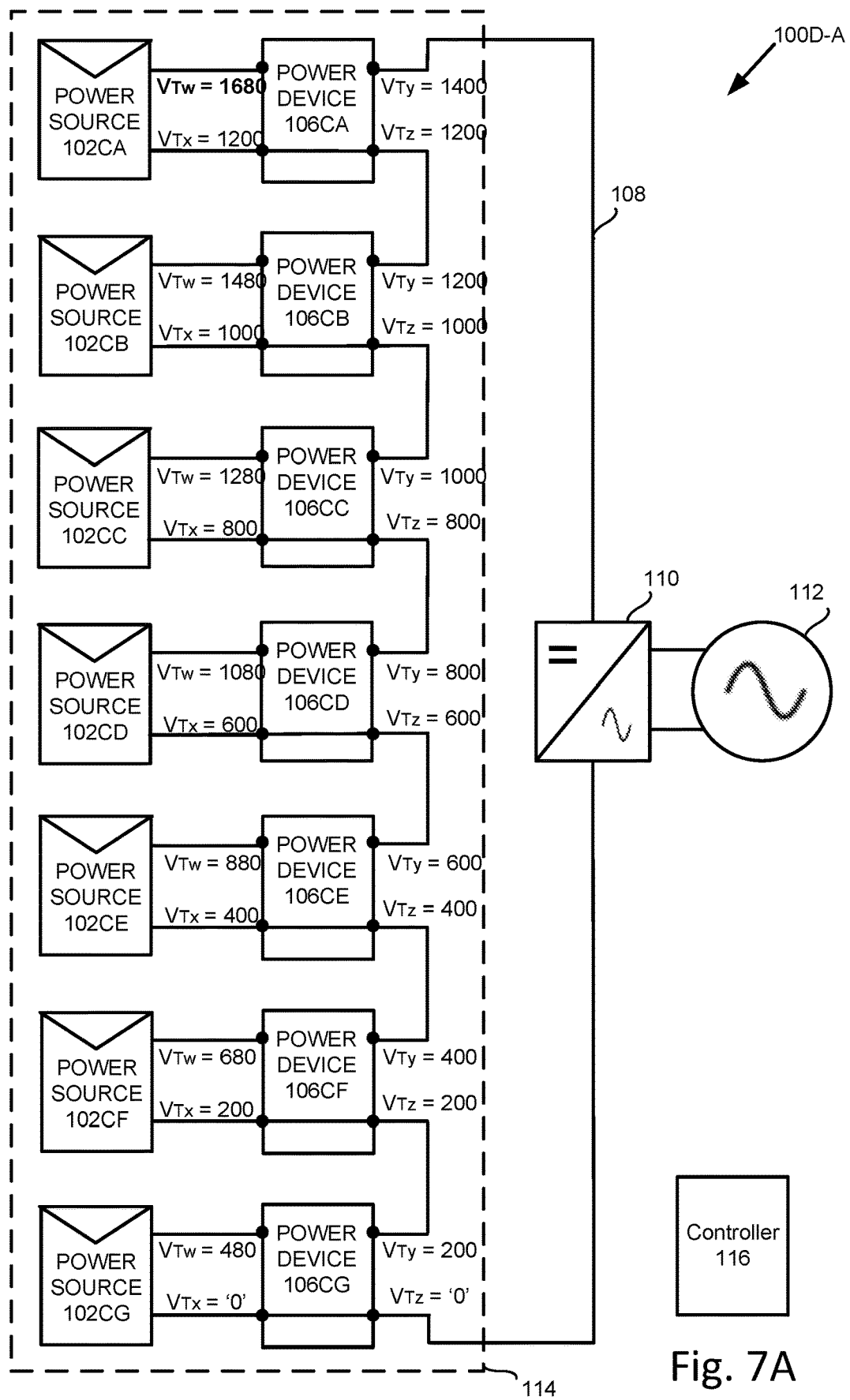
FIG. 7A shows an example power system.
Figure 7B:
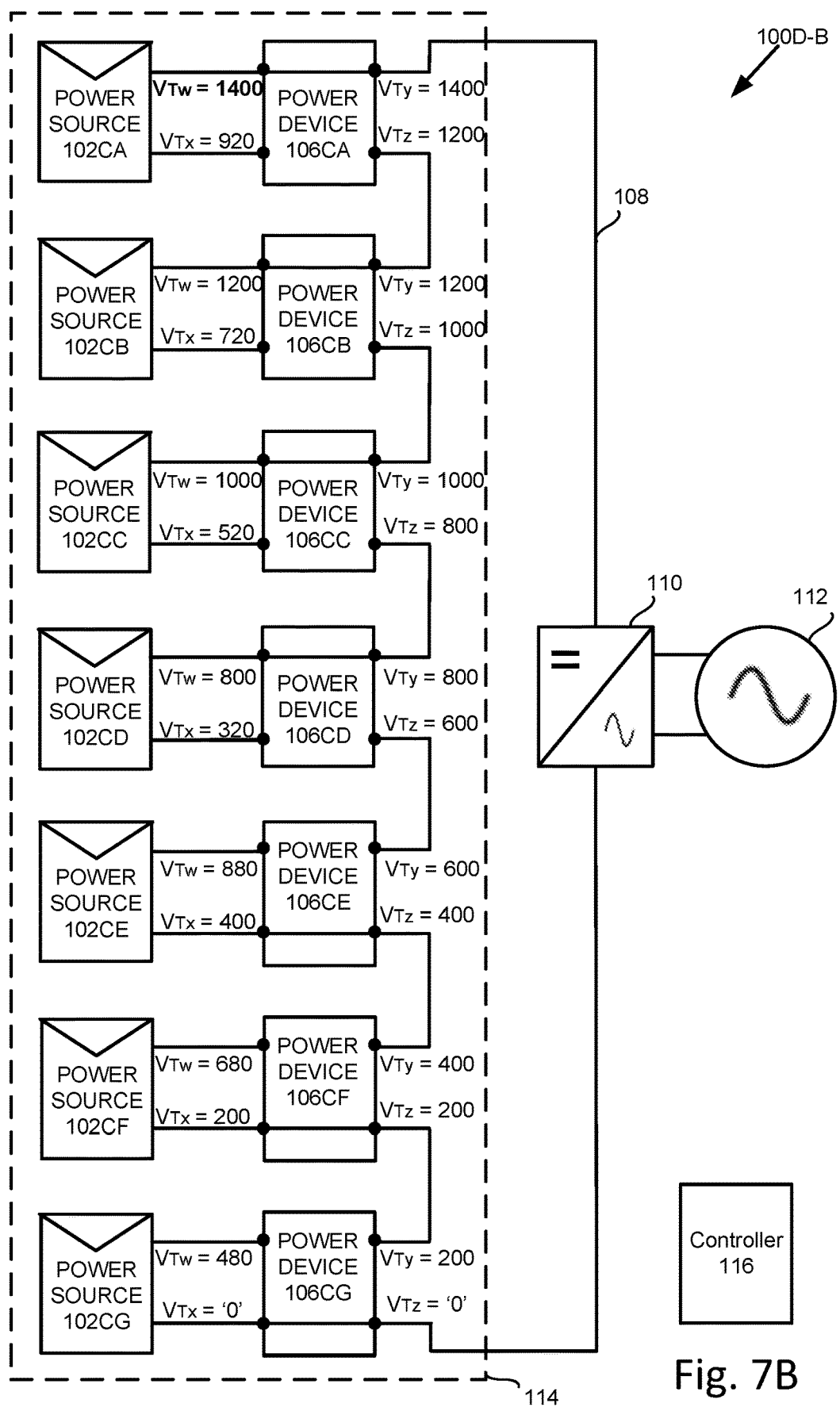
FIG. 7B shows an example power system.

FIG. 6 to FIG. 7B show examples of various power systems 100 with power devices 106. The power devices 106 shown in FIG. 6 to FIG. 7B may be any appropriate power device 106, such as those shown or described herein.

Reference is now made to FIG. 6, which shows a power system 100C. Power system 100C shows a series string 114 of power devices 106CA-106CG. Each power device 106CA-106CG is shown as being connected to a single power source 102, but, as may be shown in FIG. 1, the power system may have a plurality of power sources connected to one or more of the power devices. One series string 114 is shown in FIG. 6. In some examples, the power system may have a plurality of series strings, as may be shown in FIG. 2.

One or more of the power devices 106CA-106CG may be in an upside-up buck configuration, and one or more of the power devices 106CA-106CG may be in an upside-down buck configuration. For example, power device 106CG may be in the upside-up buck configuration, which may enable a voltage at input terminal Tx of power device 106CG to be substantially equal to the voltage at output terminal Tz of power device 106CG. Output terminal Tz of power device 106CG may be connected to the low side of bus 108. Power device 106CA may be in the upside-down buck configuration, which may enable a voltage at input terminal Tw of power device 106CA to be substantially equal to the voltage at output terminal Ty of power device 106CA. Output terminal Ty of power device 106CA may be connected to the high side of bus 108. The arrangement of the power system 100C may be configured to ensure that the voltage at input terminal Tw of power device 106CA (and possibly by extension, voltage at all terminals of power devices 106CA-106CG) are below a threshold.

FIG. 7A shows a power system 100D-A where all of the power devices 106CA-106CG shown in FIG. 6 are in an upside-up buck configuration (with terminal Tx directly connected to terminal Tz). In FIG. 7A, each power source 102CA-102CG may be producing 480 V across the respective input terminals Tw, Tx, to power devices 106. Each power device 106CA-106CG may be outputting 200 V across the respective output terminals Ty and Tz. For example, the total string voltage of 1400 V may be set by system power device 110. In this example, the voltage at the input terminal Tw of power device 106CA may be about 1680 V (voltage Vtw=about 1680 V). This may be above a certain threshold voltage (e.g., above a threshold voltage of about 1500 V). Furthermore, if one or more of the power devices were not reducing a voltage, then the voltage at the input terminal Tw of power device 106CA may be even greater than 1680 V.

FIG. 7B shows a power system 100D-B where one or more power devices 106 are in an upside-up buck configuration and one or more other power devices 106 are in an upside-down buck configuration. In this example, power devices 106CA-106CD (which may be the power devices shown in FIG. 6) are in an upside-down buck configuration (with terminal Tw directly connected to terminal Ty), and power devices 106CE-106CG (which may be the power devices shown in FIG. 6) are in an upside-up buck configuration (with terminal Tx directly connected to terminal Tz).

In FIG. 7B, each power source 102CA-102CG may be producing 480 V across the respective input terminals Tw and Tx. Each power device 106CA-106CG may be outputting 200 V across the respective output terminals Ty and Tz. For example, the total string voltage of 1400 V may be set by system power device 110. As another example, the total string voltage may correspond to a sum of voltages output by each one of the power devices 106CA-106CG while executing a maximum power point algorithm.

In FIG. 7B, the voltage at the input terminal Tw of power device 106CA may be about 1400 V (voltage Vtw=about 1400 V). This may be below a certain threshold voltage (e.g., below a threshold voltage of about 1500 V). For example, the voltage at the input terminal Tw of power source 102CA may be maintained at about 1400 V (e.g., since the voltage at input terminal Tw of power source 102CA may be substantially equal to the voltage at output terminal Ty of power source 102CA, and voltage Vty=about 1400 V). Furthermore, even if one or more of the power sources were not producing power, then the voltage at the input terminal Tw of power device 106CA may be maintained below the threshold voltage. For example, even if one or more power source 102 were not producing power, and/or one or more power devices 106 were bypassed, then the voltage at the input terminal Tw of power source 102A may be maintained below the threshold voltage (e.g., since the voltage at the input terminal Tw of power source 102CA may be tied to the voltage at output terminal Ty of power source 102CA, and the top power device of the serial string 114 may be configured with an upside-down buck configuration such that voltage Vtw=about 1400 V and voltage Vty=about 1400 V.

In some examples, the configuration of one or more power devices may be chosen based on the location of one or more power devices in the series string.

One or more power devices 106 may be configured to change modes of operation. For example, one or more power devices may be configured to switch from an upside-up configuration mode to an upside-down configuration mode and vice versa. The power devices 106 may be configured to change modes of operation such that a power device 106 that is operating at the top of the serial string 114 (e.g., connected to the high-voltage side of DC bus 108) may be operating in the upside-down buck configuration mode. The power system 100 may be configured to control the mode of operation of one or more of the power devices 106 such that the voltage at terminal Tw (which may be connected to, or have about the same voltage as, terminal Ty) does not exceed a certain threshold voltage. One or more controllers 116 of the power system may determine one or more parameters related to the operation of one or more power devices 106, and/or may send one or more signals including one or more instructions to control the one or more power devices 106.

If power devices 106CA-106CD of FIG. 7B are bypassed, power device 106CE may change modes of operation. Power device 106CE may switch from an upside-up buck configuration mode to an upside-down buck configuration mode (e.g., such that an upside-down buck is connected to the high side of bus 108). If one or more of the power devices 106CA-106CD are no longer bypassed (e.g., power source 102CA produces power above a power threshold, and/or power device 102CA is no longer bypassed), then power device 106CE may change modes of operation again. For example, power device 106CE may switch from the upside-down buck configuration mode back to the upside-up buck configuration mode.

If power devices 106CE-106CG of FIG. 7B are bypassed, power device 106CD may change modes of operation. Power device 106CD may switch from an upside-down buck configuration mode to an upside-up buck configuration mode (e.g., such that an upside-up buck is connected to the low side of bus 108). If one or more of the power devices 106CE-106CG are no longer bypassed (e.g., power source 102CG produces power above a power threshold, and/or power device 102CG is no longer bypassed), then power device 106CD may change modes of operation again. For example, power device 106CD may switch from the upside-up buck configuration mode back to the upside-down buck configuration mode.

The configuration of one or more power devices may be changed based on one or more other determinations. For example, the configuration of one or more power devices may be changed based on one or more determinations related to maintaining a certain ratio of upside-up bucks and upside-down bucks in the power system. This determination may be made independently from, or in addition to, a determination related to the location of one or more power devices in the series string. The configuration of one or more power devices may be changed based on one or more determinations related to maintaining an electrical parameter within a certain threshold.

FIG. 8A to FIG. 14 show examples of various power devices 106. The power devices 106 shown in FIG. 8A to FIG. 14 may be part of the various power systems 100 shown in the figures and described herein. The power devices 106 of FIG. 8A to FIG. 14 may show examples of a plurality of configuration modes.

Figure 8A:
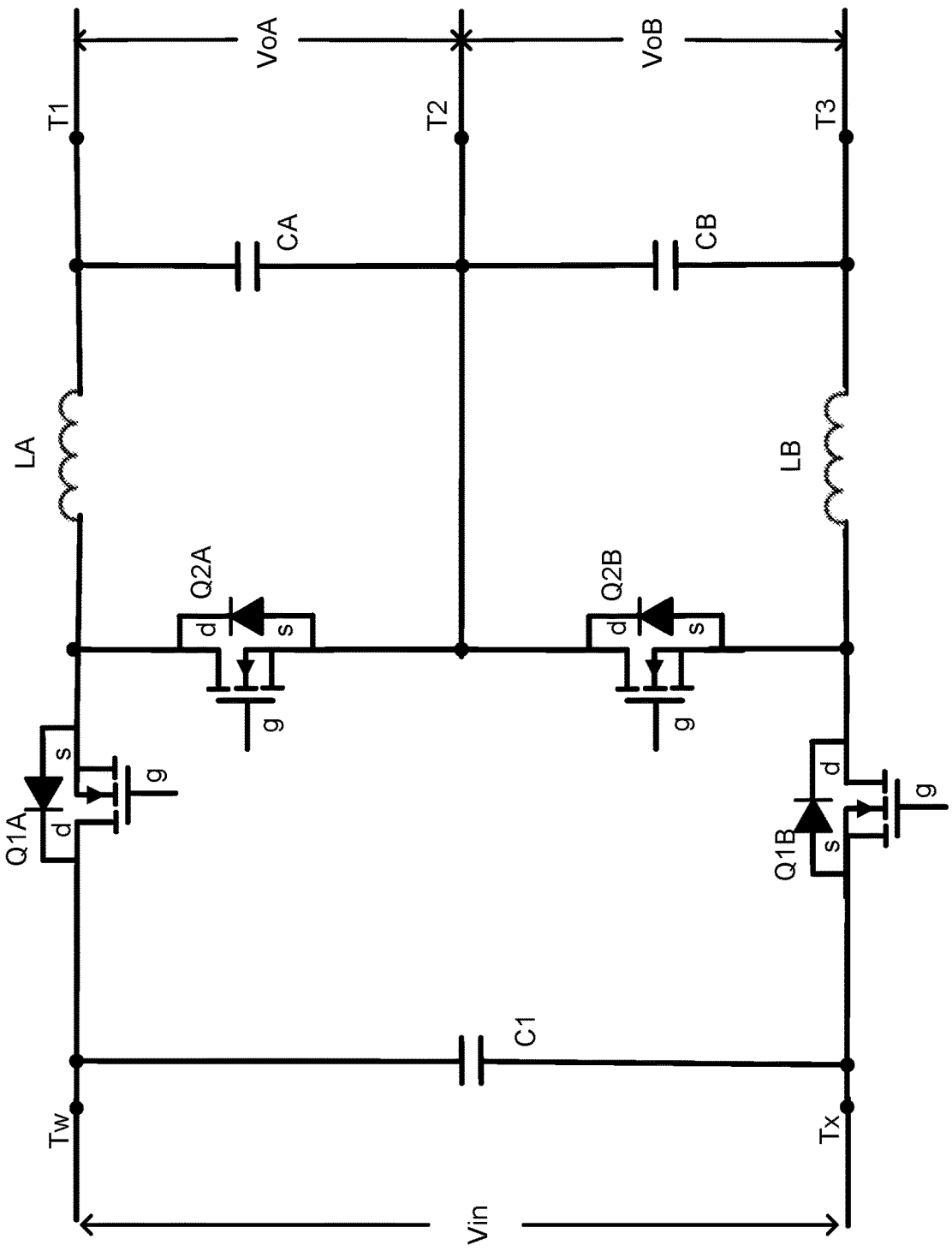
FIG. 8A shows an example power device with a plurality of modes of operation.

Reference is now made to FIG. 8A, which shows an example power device 106-DA. Power device 106-DA may be configured to operate in a plurality of modes. Power device 106-DA may be configured to operate in an upside-up buck configuration mode of operation or in an upside-down buck configuration mode of operation.

(E.g., if switch Q1B and switch Q2B are ON) power device 106-DA may be in the upside-up buck configuration mode. In the upside-up buck configuration mode, switch Q1A and switch Q2A may operate in an alternating manner (e.g., a controller may be configured to execute a pulse width modulation [PWM] control mode, wherein when Q1A is ON then Q2A is OFF, and vice versa). In the upside-up buck configuration mode, switch Q1A and switch Q2A may be operated to provide, together with inductor LA and output capacitor CA, an output voltage VoA between terminal T1 and terminal T2.

(E.g., if switch Q1A and switch Q2A are ON) power device 106-DA may be in an upside-down buck configuration mode. In the upside-down buck configuration mode, switch Q1B and switch Q2B may operate in an alternating manner (e.g., a controller may be configured to execute a pulse width modulation [PWM] control mode, wherein when Q1B is ON then Q2B is OFF, and vice versa). In the upside-down buck mode configuration, switch Q1B and switch Q2B may be operated to provide, together with inductor LB and capacitor CB, an output voltage VoB between terminal T2 and terminal T3.

Although switches Q1A, Q2A, Q1B, Q2B are shown in FIG. 8A as MOSFET switches, other switch types (e.g., BJTs) may be used for one or more of the switches Q1A, Q2A, Q1B, or Q2B.

The term "switching element" used herein may refer to any appropriate reversible switching element that may be switched in a non-permanent fashion, or may refer to any appropriate irreversible switching element that may be switched in a permanent fashion. The switching element may be any appropriate switching device that is electrical, mechanical, electromechanical, etc. An example of a reversible switching element that may be switched in a non-permanent fashion may be any appropriate relay or switch, for example: an electromechanical relay, a field effect transistor (FET), a metal-oxide-semiconductor field-effect transistor (MOSFET), a bipolar junction transistor (BJT), an insulated-gate bipolar transistor (IGBT), a Silicon Carbide (SiC) switch, a Gallium Nitride (GaN) switch, a mechanical switch, a diode, etc. An example of an irreversible switching element that may be switched in a permanent fashion is a fuse or breaker that is configured to be burned or opened according to one or more certain electrical parameters (e.g., voltage and/or current above a certain threshold). The term "burn" or "blow" used herein may refer to a situation wherein the fuse may be configured to be limited or rated to one or more certain threshold electrical parameters (e.g., voltage, current, power, etc.), and if one or more electrical parameters exceeding the threshold electrical parameters are applied to the fuse, then at least a portion of the fuse may respond accordingly to open the related electrical pathway (e.g., at least a portion of the fuse may melt, disconnect, become an open circuit element, etc.). The one or more switching elements may be configured to set a configuration mode of a power device either permanently or non-permanently. A reversible switching element that may be switched in a non-permanent fashion may also be referred to herein as "a multiple-use switch" or "a multi-use switch". An irreversible switching element that may be switched in a permanent fashion may also be referred to herein as "a one-time use switch" or "a single-use switch".

Power device 106-DA may include additional switching elements not shown in FIG. 8A. For example, these additional switching elements may control the connection of one or more output terminals T1, T2, T3 to the output capacitors CA, CB (e.g., so that the output capacitor that is not being used may be disconnected from one or more of the output terminals). The additional switching elements may be any appropriate switching element, such as the examples of switching elements provided above.

Power device 106-DA may be configured to operate in one of the different modes of operation in response to receiving one or more signals or parameters. The one or more signals may include one or more data instructions related to the mode of power conversion to be used by power device 106-DA. The one or more parameters may be one or more electrical parameters. The one or more electrical parameters may be, for example, at least one of a detected: a voltage, a current, or a power (e.g., a detected DC voltage level rather than data sent as a variable voltage). The one or more parameters may be related to a threshold. The threshold may be a voltage threshold. In some examples power device 106-DA may be configured to change modes of operation in response to a sensed voltage being above or below a voltage threshold.

The one or more signals or parameters may be related to an operational state of one or more other power devices connected to power device 106-DA. For example, the operational state may be indicative of a malfunctioning or non-functioning state of the other converter. As another example, the operational state may be indicative of a type or mode of operation of another converter (e.g., upside-up buck configuration mode or upside-down buck configuration mode). If the one or more signals or parameters is indicative that another power device which was operating at the top of the series string has been bypassed, then power device 106-DA may change its mode of operation accordingly. For example, if power device 106-DA was operating in an upside-up buck configuration mode, and the other bypassed power device was operating in an upside-down buck configuration mode, then power device 106-DA may switch to an upside-down buck configuration mode.

The mode of operation of power device 106-DA and/or other power devices 106 of the power system 100 may be set, permanently or non-permanently, in a preliminary configuration of the power device 106-DA and/or the power system.

The configuration of power device 106-DA may be controlled by one or more controllers that are configured to control whether power device 106-DA is in an upside-up buck configuration mode or an upside-down buck configuration mode. The controller may be configured to control which mode of operation power device 106-DA is in by using one or more signals transmitted by the controller to control one or more switches Q1A, Q2A, Q1B, Q2B of power device 106-DA. The controller may be configured to control which mode of operation power device 106-DA has based on one or more signals or parameters obtained by the controller.

Figure 8B:
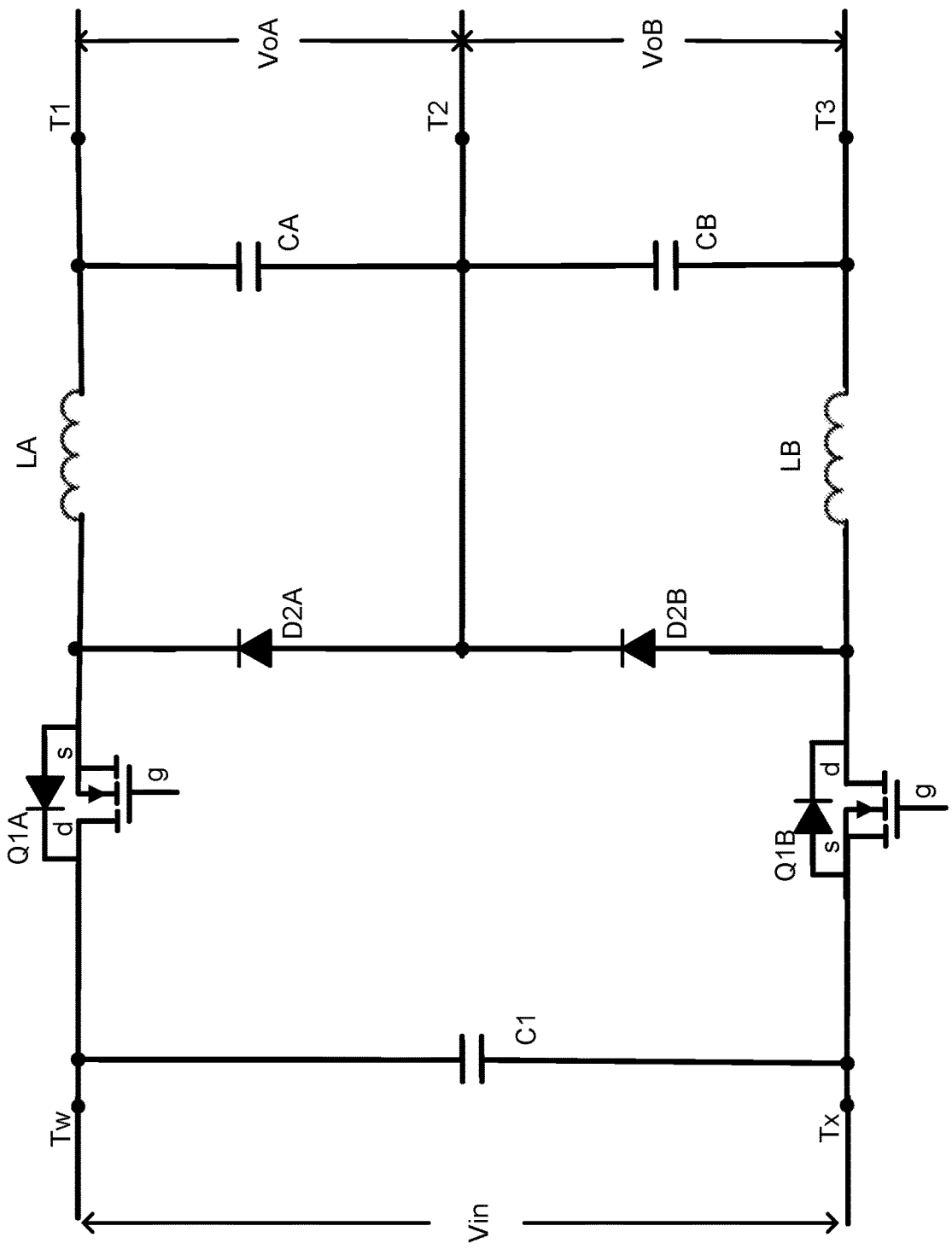
FIG. 8B shows an example power device with a plurality of modes of operation.

FIG. 8B shows an example power device 106-DB. Power device 106-DB may be similar to power device 106-DA or other power devices 106 shown and described herein (e.g., power device 106-DB may be the same as power device 106-DA except it includes diode D2A and diode D2B instead of switch Q2A and switch Q2B).

Power device 106-DB may be configured to operate in a plurality of modes. Power device 106-DB may be configured to operate in an upside-up buck configuration mode of operation and in an upside-down buck configuration mode of operation.

For example, if switch Q1B is ON then power device 106-DB may be in the upside-up buck configuration mode. In the upside-up buck configuration mode, switch Q1A may operate alternatingly. In the upside-up buck configuration mode, switch Q1A and diode D2A, together with inductor LA and output capacitor CA, may provide an output voltage VoA across terminal T1 and terminal T2.

As another example, if switch Q1A is ON then power device 106-DB may be in an upside-down buck configuration mode. In the upside-down buck configuration mode, switch Q1B may operate alternatingly. In the upside-down buck mode configuration, switch Q1B and diode D2B (e.g., together with inductor LB and output capacitor CB) may provide an output voltage VoB across terminal T2 and terminal T3.

Figure 9A:
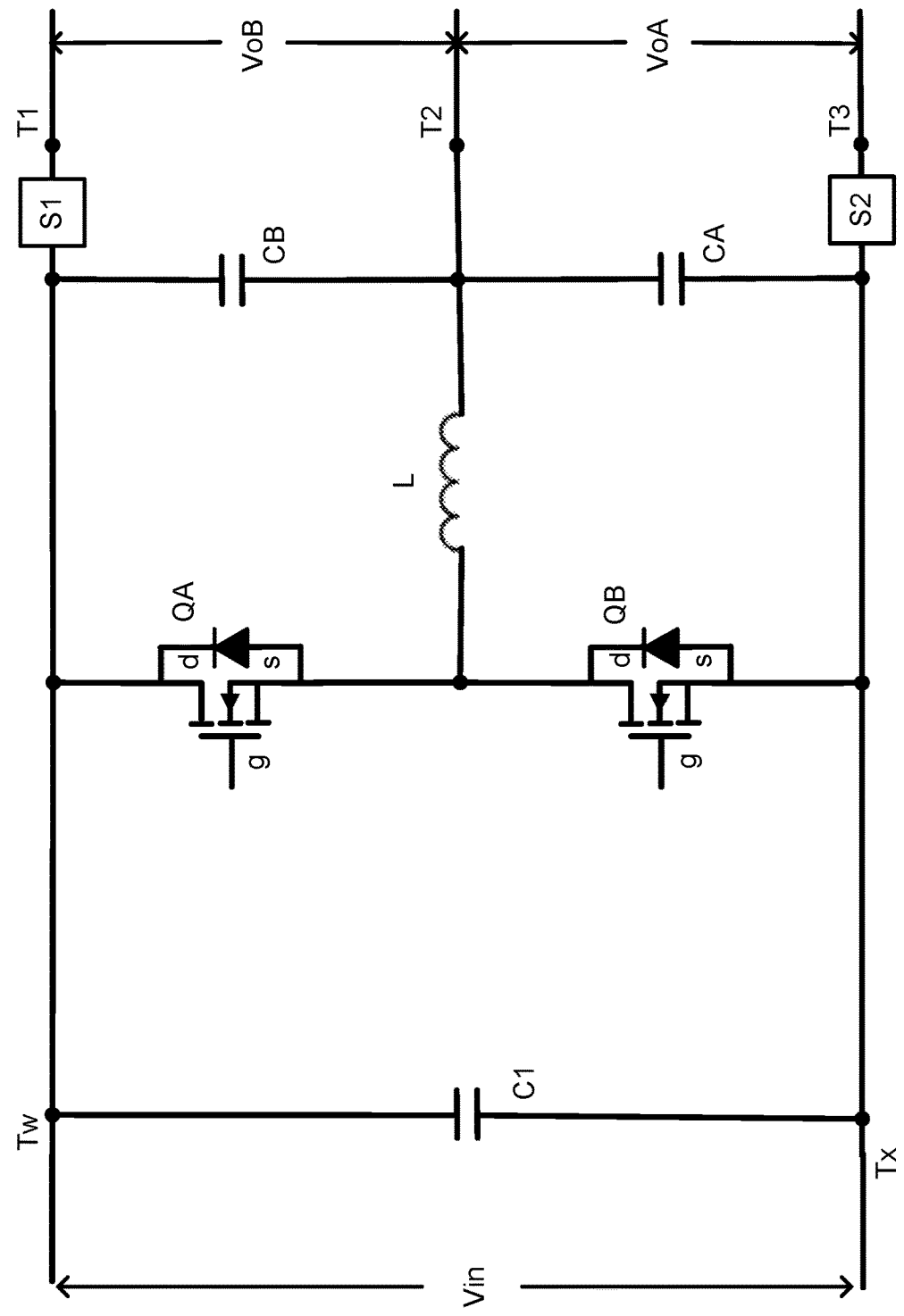
FIG. 9A shows an example power device with a plurality of modes of operation.

FIG. 9A shows an example power device 106-E. Power device 106-E may be configured to operate in a plurality of modes. Power device 106-E may be configured to operate in an upside-up buck configuration mode of operation and in an upside-down buck configuration mode of operation.

Power device 106-E may include one or more switching elements S1 or S2. Switching elements S1 and S2 may be irreversible or reversible switching elements. Switching element S1 may be switchably connected between a terminal of output capacitor CB and an output terminal T1. In some examples other arrangements may be possible. For example, switching element S1 may be connected between a terminal of switch QA and a terminal of output capacitor CB. Switching element S2 may be switchably connected between a terminal of output capacitor CA and an output terminal T3. In another example, switching element S2 may be connected between a terminal of switch QB and a terminal of output capacitor CA. Output capacitor CA and output capacitor CB may also each have a terminal connected to output terminal T2.

Power device 106-E may include an inductor L that may be configured to operate in the upside-up buck configuration mode of operation and the upside-down buck configuration mode of operation. Inductor L may be connected between output terminal T2 and a terminal shared by switch QA and switch QB.

Figure 9B:
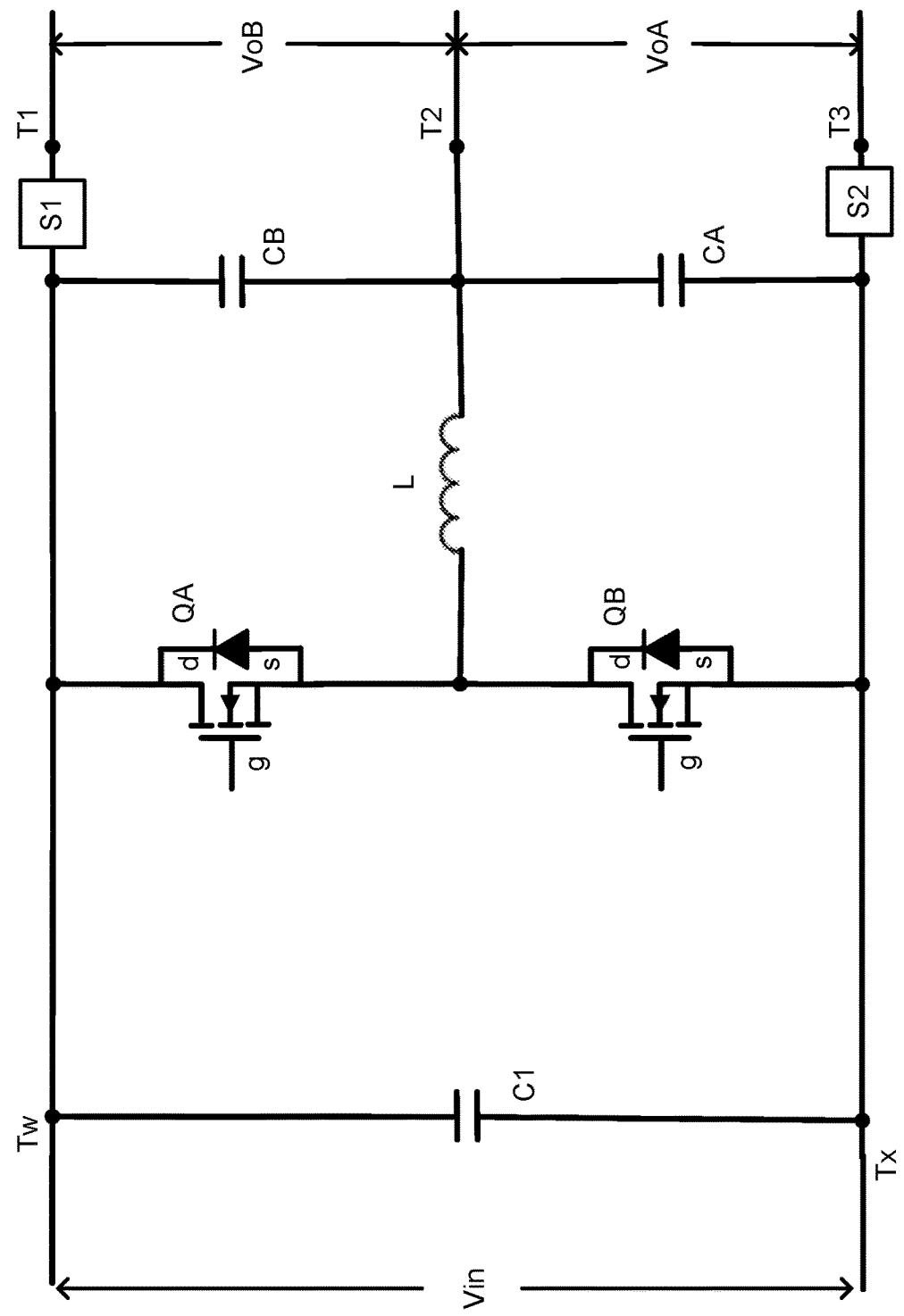
FIG. 9B shows the example power device of FIG. 9A in an upside-up buck configuration mode.

FIG. 9B shows an example power device 106-E in an upside-up buck configuration mode of operation. Switching element S1 may be turned OFF, which may disconnect the terminal of output capacitor CB from output terminal T1. Switching element S2 may be turned ON, which may create a connection between the terminal of output capacitor CA and output terminal T3 (symbolized by a line through switching element S2). Turning switching element S2 ON may connect negative input terminal Tx to negative output terminal T3 (via switching element S2). In such a case the negative input terminal Tx may have substantially the same voltage as the negative output terminal T3. In this case, power device 106-E may be in an upside-up buck configuration mode with an output voltage of VoA between output terminal T2 and output terminal T3.

Figure 9C:
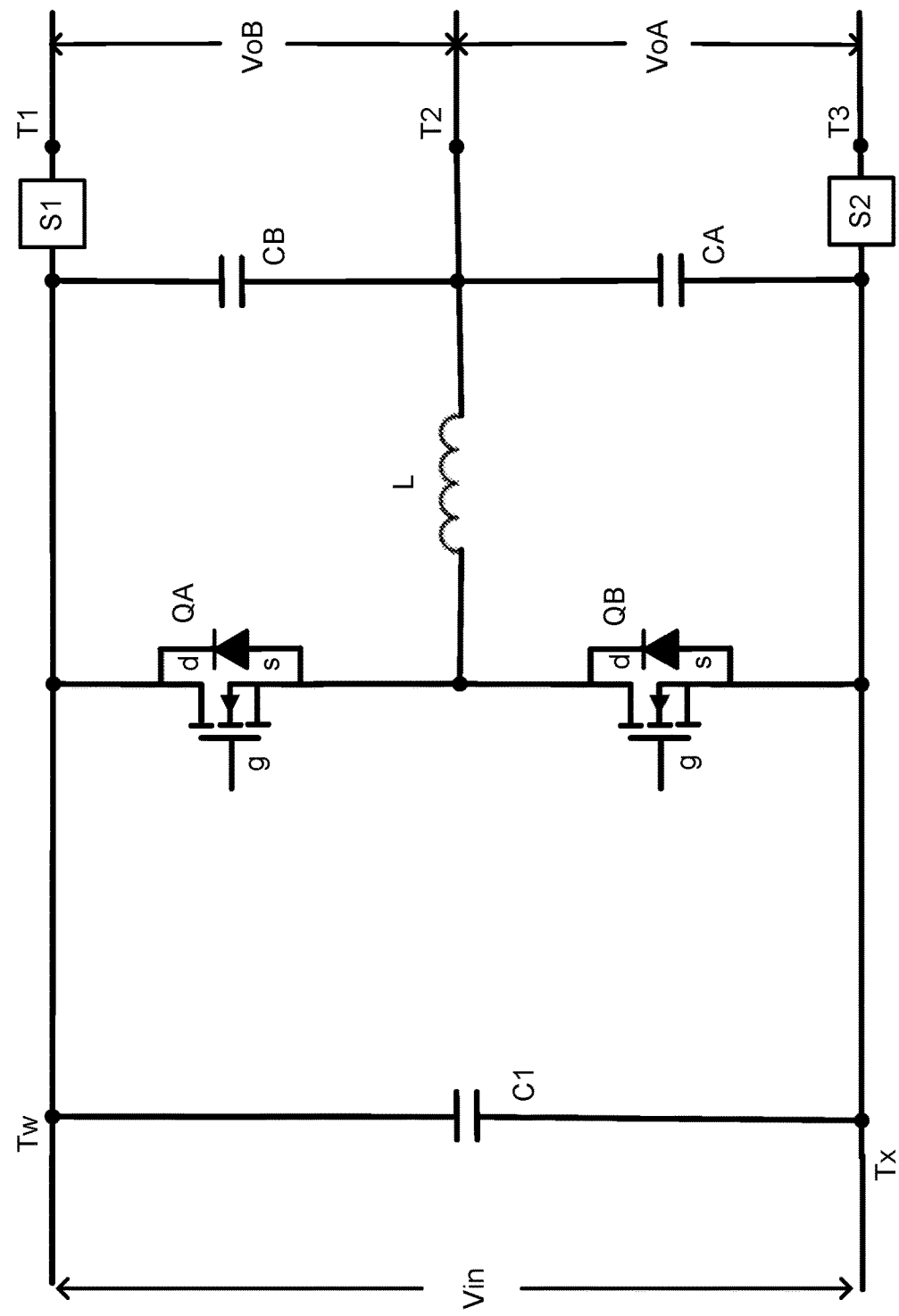
FIG. 9C shows the example power device of FIG. 9A in an upside-down buck configuration mode.

FIG. 9C shows an example power device 106-E in an upside-down buck configuration mode of operation. Switching element S1 may be turned ON, which may create a connection between the terminal of output capacitor CB and output terminal T1 (symbolized by a line through switching element S1). Switching element S2 may be turned OFF, which may disconnect the terminal of output capacitor CA from output terminal T3. Turning switching element S1 ON may directly connect positive input terminal Tw to positive output terminal T1 (via switching element S1). The positive input terminal Tw may have substantially the same voltage as the positive output terminal T1. In this case, power device 106-E may be in an upside-down buck configuration mode with an output voltage of VoB between output terminal T1 and output terminal T2.

Figure 10A:
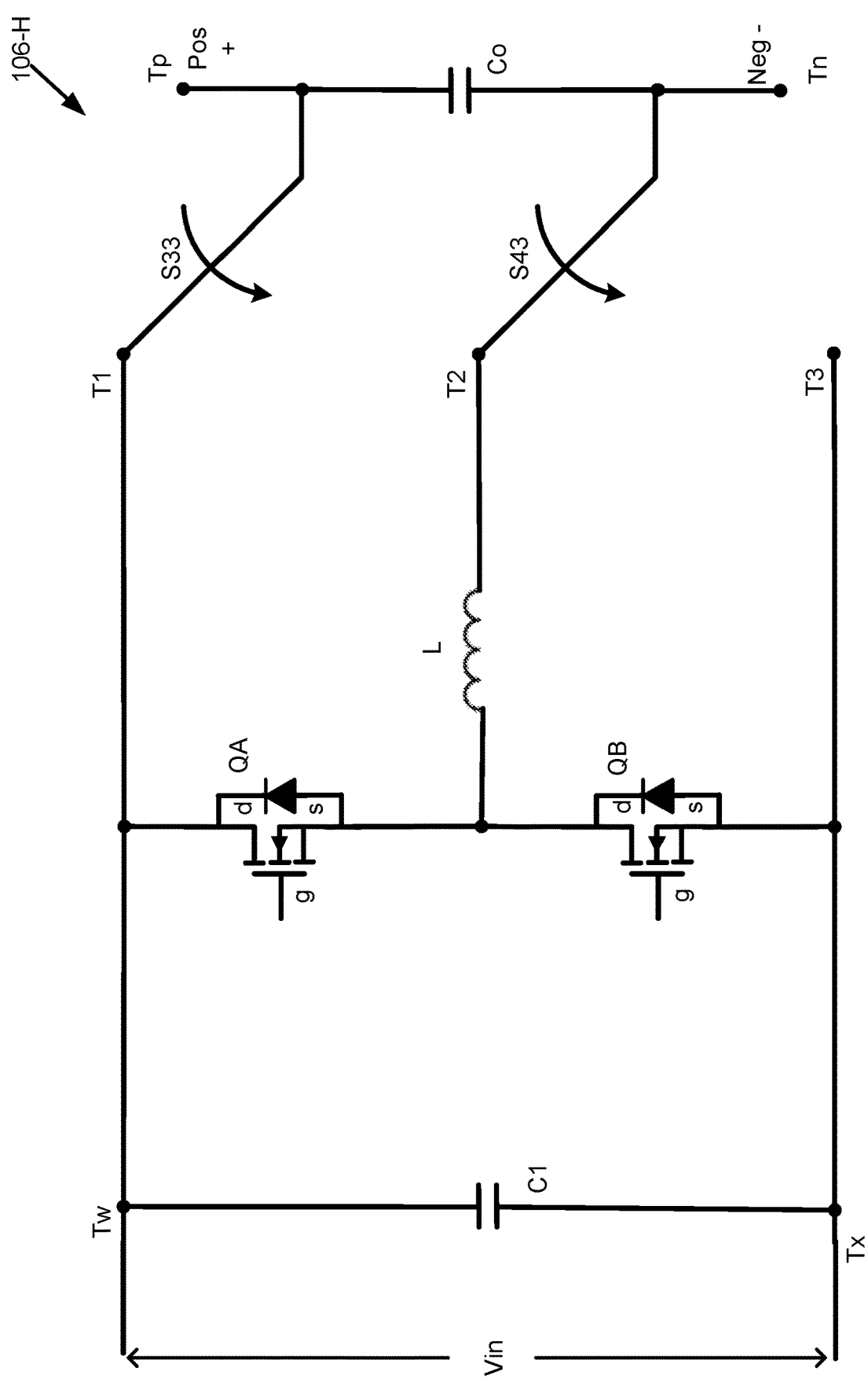
FIG. 10A shows an example power device with a plurality of modes of operation in an upside-down buck configuration mode.
Figure 10B:
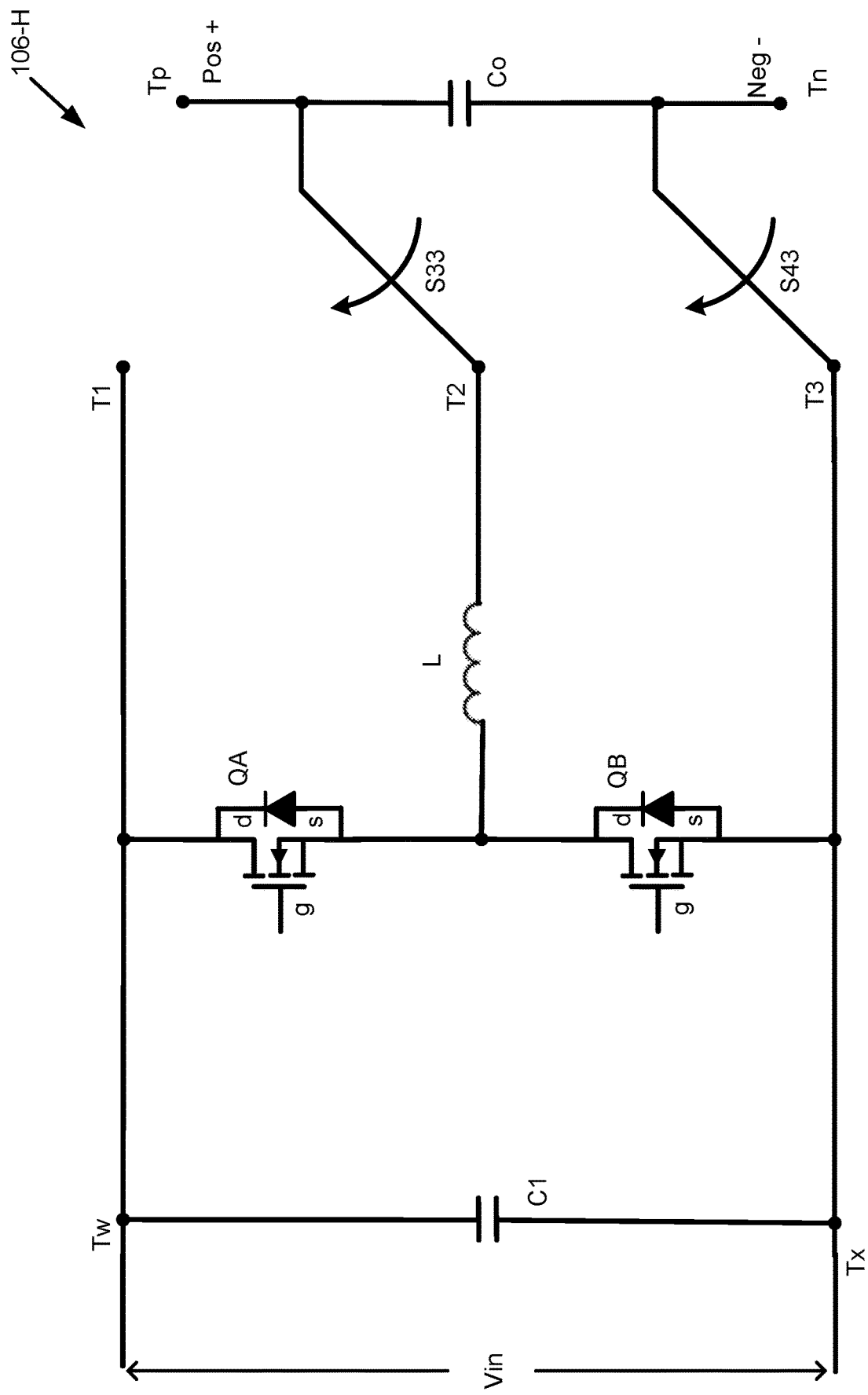
FIG. 10B shows the example power device of FIG. 10A in an upside-up buck configuration mode.

FIG. 10A shows an example power device 106-H in an upside-down buck configuration mode of operation and FIG. 10B shows the example power device 106-H in an upside-up buck configuration mode of operation.

Power device 106-H may be a power device 106 with switching elements S33 and S43, and/or an output capacitor Co connected between output terminals Pos+ and Neg−. Switching element S33 may be switchably connected between either output terminal T1 or output terminal T2 and a positive output terminal Tp of the power device 106-H. Switching element S43 may be switchably connected between either output terminal T2 or output terminal T3 and a negative output terminal Tn of the power device 106-H. Shared output capacitor Co may be connected between positive output terminal Tp and negative output terminal Tn. Output capacitor Co may be disposed across the output terminals in both the upside-up buck configuration mode of operation or the upside-down buck configuration mode of operation. Power device 106-H may be arranged to have a plurality of output terminals Tp and Tn (which may be outputs regardless of the mode of operation). For example, the same plurality output terminals Tp and Tn, may be configured to provide the output whether the power device 106-H is in the upside-up buck configuration mode of operation or the upside-down buck configuration mode of operation.

The arrangement of power device 106-H may be configured so that the power device 106-H has only two output terminals between the output of power device 106-H and one or more additional electrical elements. These two output terminals, positive output terminal Tp and negative output terminal Tn, may be connected to any appropriate electrical element or device, for example, one or more other power devices, a DC bus, one or more loads, etc. As in the examples shown above, a plurality of power devices 106-H may be connected in series to form one or more series strings 114.

Referring to FIG. 10A, switching element S33 may connect output terminal T1 to positive output terminal Tp and switching element S43 may connect output terminal T2 to negative output terminal Tn (e.g., when power device 106-H is in an upside-down buck configuration mode). In this case, positive input terminal Tw may be directly connected to output terminal T1 and positive output terminal Tp (via switching element S33). In such a case, the positive input terminal Tw may have substantially the same voltage as the output terminal T1 and the positive output terminal Tp.

Referring to FIG. 10B, switching element S33 may connect output terminal T2 to positive output terminal Tp and switching element S43 may connect output terminal T3 to negative output terminal Tn (e.g., when power device 106-H is in an upside-up buck configuration mode). In this case, negative input terminal Tx may be directly connected to output terminal T3 and negative output terminal Tn (via switching element S43). In such a case, the negative input terminal Tx may have substantially the same voltage as the output terminal T3 and the negative output terminal Tn.

Figure 11A:
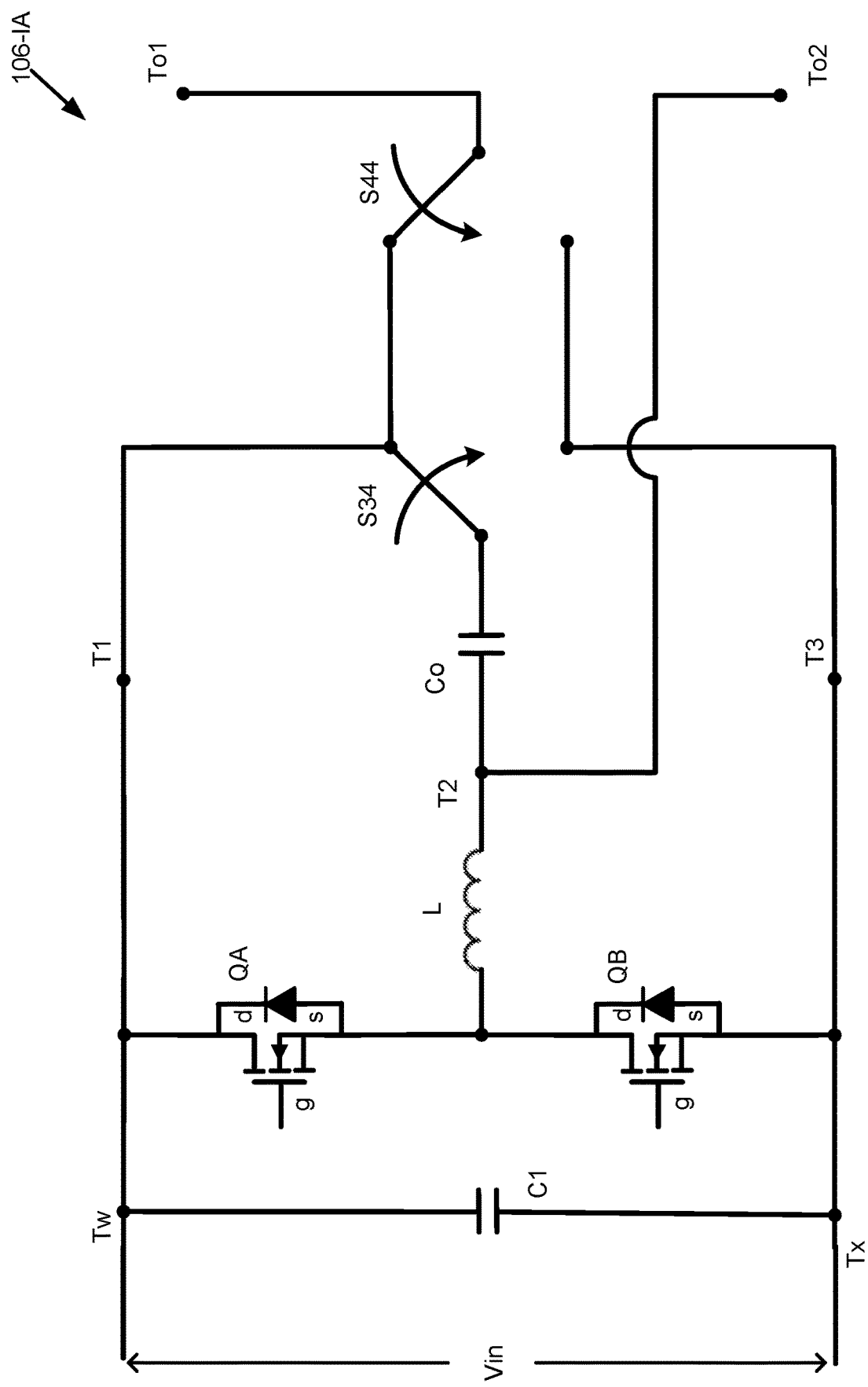
FIG. 11A shows an example power device with a plurality of modes of operation in an upside-down buck configuration mode.
Figure 11B:
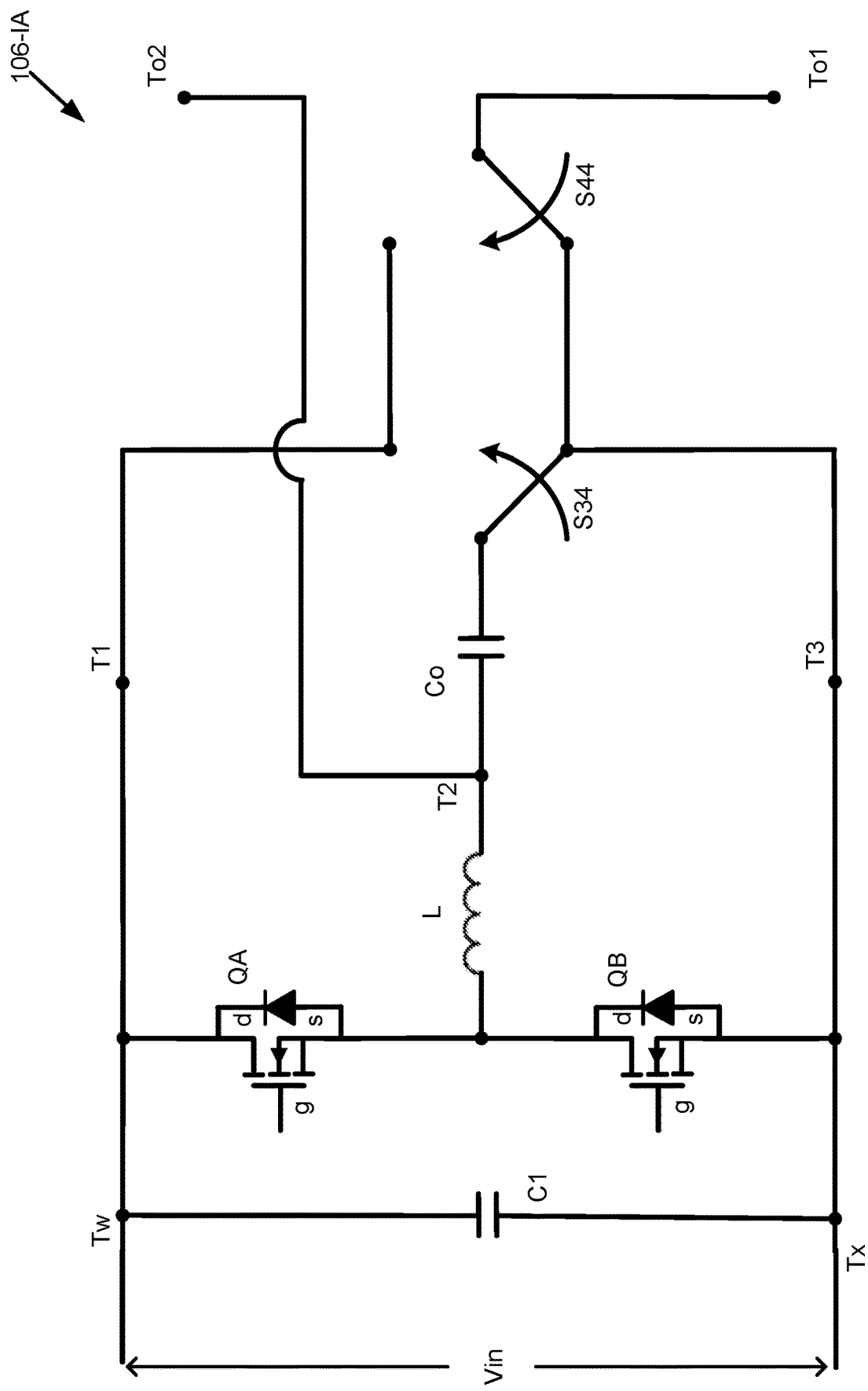
FIG. 11B shows the example power device of FIG. 11A in an upside-up buck configuration mode.

FIG. 11A shows an example power device 106-IA in an upside-down buck configuration mode of operation and FIG. 11B shows the example power device 106-IA in an upside-up buck configuration mode of operation.

Power device 106-IA includes an output capacitor Co that is configured to operate in the upside-up buck configuration mode of operation and the upside-down buck configuration mode of operation. Output capacitor Co may be connected between output terminal T2 and a terminal of a switching element S34.

Power device 106-IA may include, for example, switching elements S34 and S44. Switching element S34 may be switchably connected between either output terminal T1 or output terminal T3 and a terminal of output capacitor Co. Switching element S44 may be switchably connected between either output terminal T1 or output terminal T3 and a first output terminal To1 of the power device 106-IA. Output terminal T2 may be directly connected to a second output terminal To2 of the power device 106-IA. Switching element S34 and switching element S44 may be configured to connect output terminal T1 or output terminal T3 to output terminal To1 depending on the mode of operation of power device 106-IA. Output terminals To1 and To2, may be connected to external outputs of the power device. These external outputs may be a plurality of mechanical connectors used to connect the power device to one or more other power devices or a DC bus (e.g., in a series string of power devices).

Referring to FIG. 11A, switching element S34 may connect a terminal of output capacitor Co to output terminal T1, and switching element S44 may connect output terminal T1 to output terminal To1 (e.g., when power device 106-IA is in an upside-down buck configuration mode). In this case, positive input terminal Tw may be directly connected to output terminal T1 and output terminal To1 (via switching element S44). In such a case, the positive input terminal Tw may have substantially the same voltage as the output terminal T1 and the output terminal To1.

Referring to FIG. 11B, switching element S34 may connect a terminal of output capacitor Co to output terminal T3, and switching element S44 may connect output terminal T3 to output terminal To1 (e.g., when power device 106-IA is in an upside-up buck configuration mode). In this case, negative input terminal Tx may be directly connected to output terminal T3 and output terminal To1 (via switching element S44). In such a case, the negative input terminal Tx may have substantially the same voltage as the output terminal T3 and the output terminal To1.

Figure 12A:
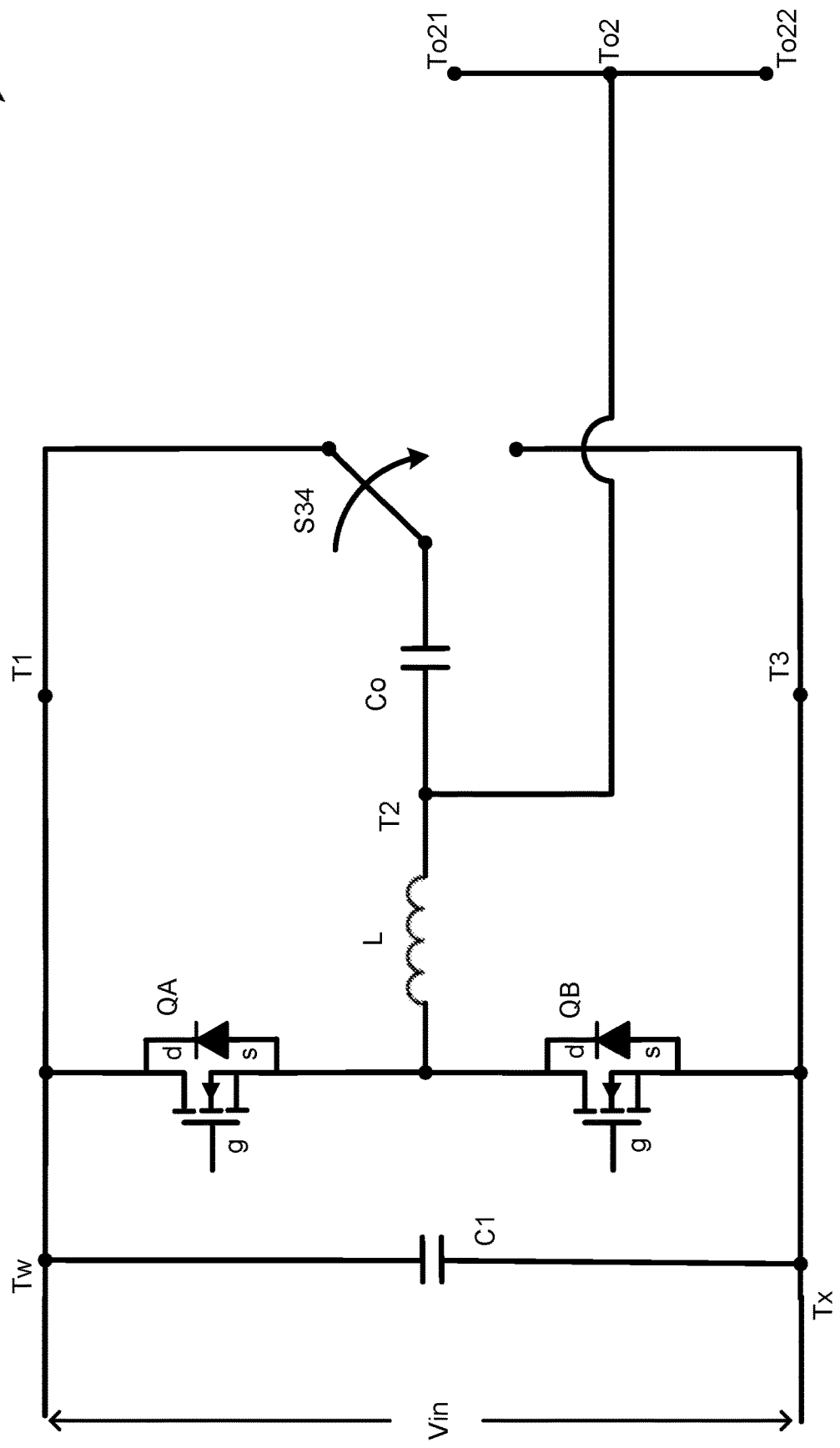
FIG. 12A shows an example power device with a plurality of modes of operation in an upside-down buck configuration mode.
Figure 12B:
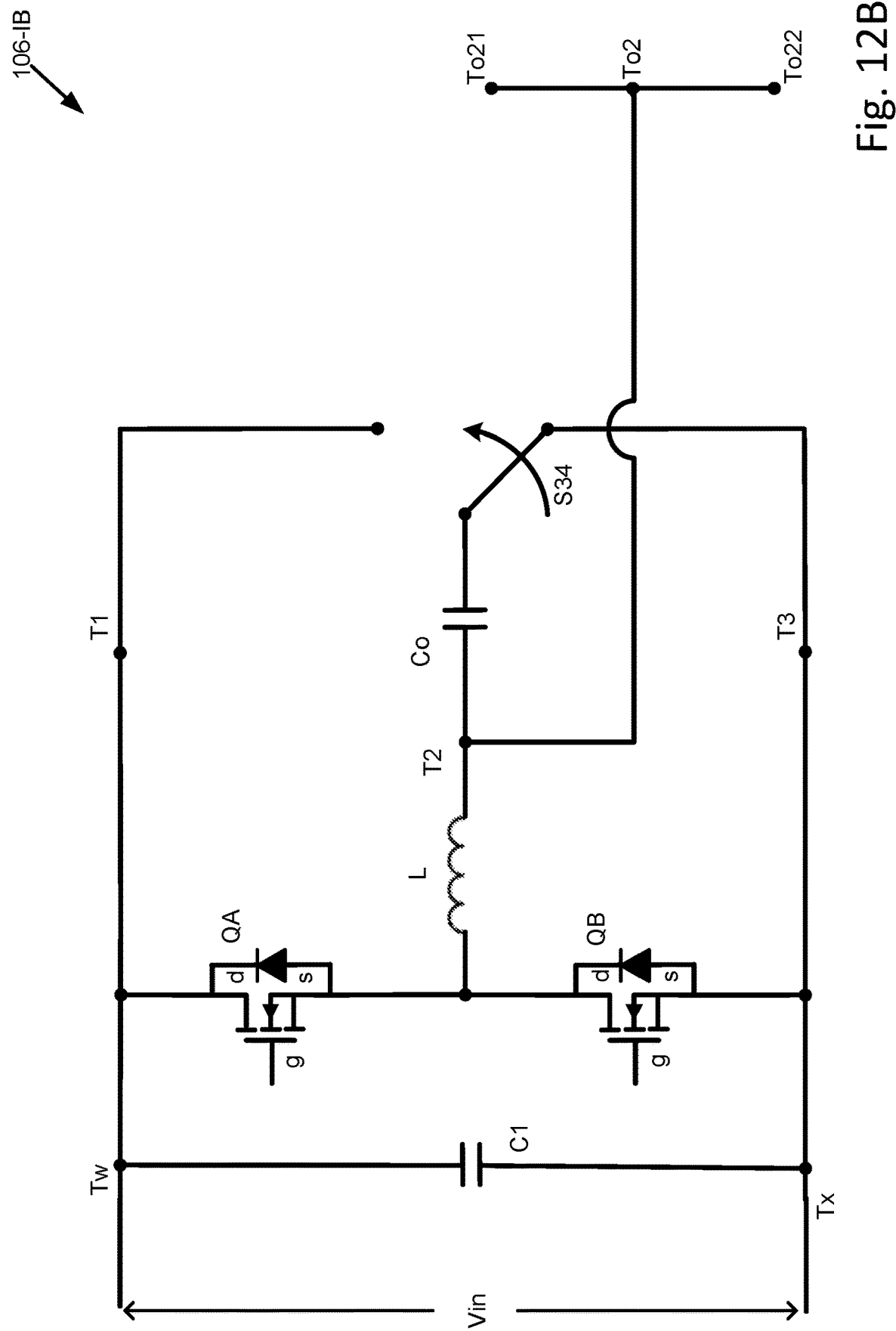
FIG. 12B shows the example power device of FIG. 12A in an upside-up buck configuration mode.

FIG. 12A shows an example power device 106-IB in an upside-down buck configuration mode of operation and FIG. 12B shows the example power device 106-IB in an upside-up buck configuration mode of operation.

Referring to FIG. 12A, positive input terminal Tw may be connected to a terminal of the output capacitor Co and terminal T3 may be disconnected from the output capacitor Co.

Referring to FIG. 12B, negative input terminal Tx may be connected to a terminal of the output capacitor Co and terminal T1 may be disconnected from the output capacitor Co.

Power device 106-IB may include a split output terminal. Output terminal To2, which is connected to terminal T2, may be split into a first output terminal To21 and a second output terminal To22. Terminal T2 may be the terminal between inductor L and the output capacitor Co. The arrangement of Power device 106-IB may be used in systems and apparatuses where a plurality of output terminals are configured to output substantially the same voltage.

Figure 13A:
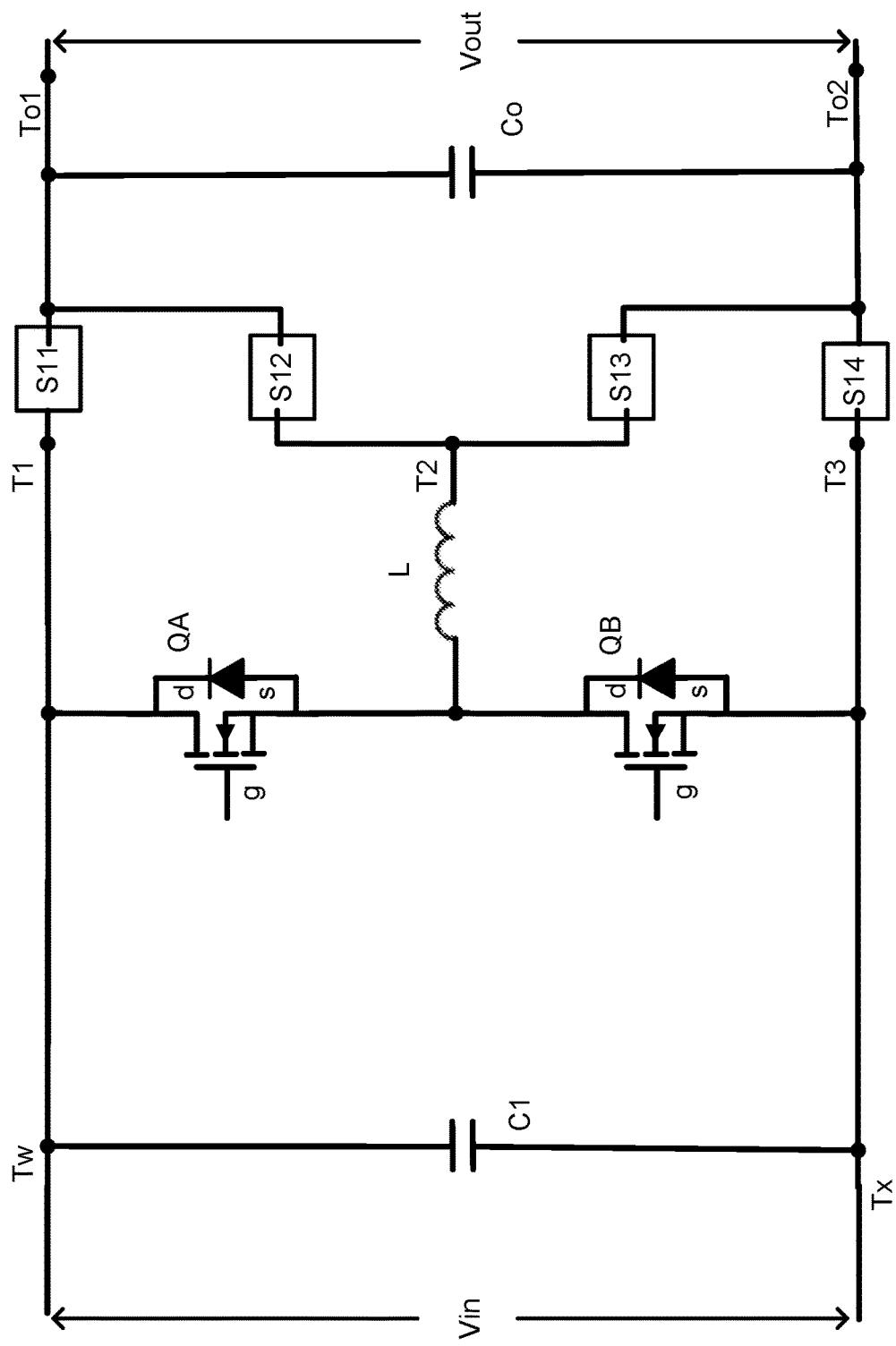
FIG. 13A shows an example power device with a plurality of modes of operation.

FIG. 13A shows an example power device 106-J. Power device 106-J may include switching elements S11-S14. Power device 106-J may include a single, shared inductor L, and/or a single, shared output capacitor Co. Switching element S11 may be switchably connected between output terminal T1 and output terminal To1. Switching element S12 may be switchably connected between output terminal T2 and output terminal To1. Switching element S13 may be switchably connected between output terminal T2 and output terminal To2. Switching element S14 may be switchably connected between output terminal T3 and output terminal To2.

Figure 13B:
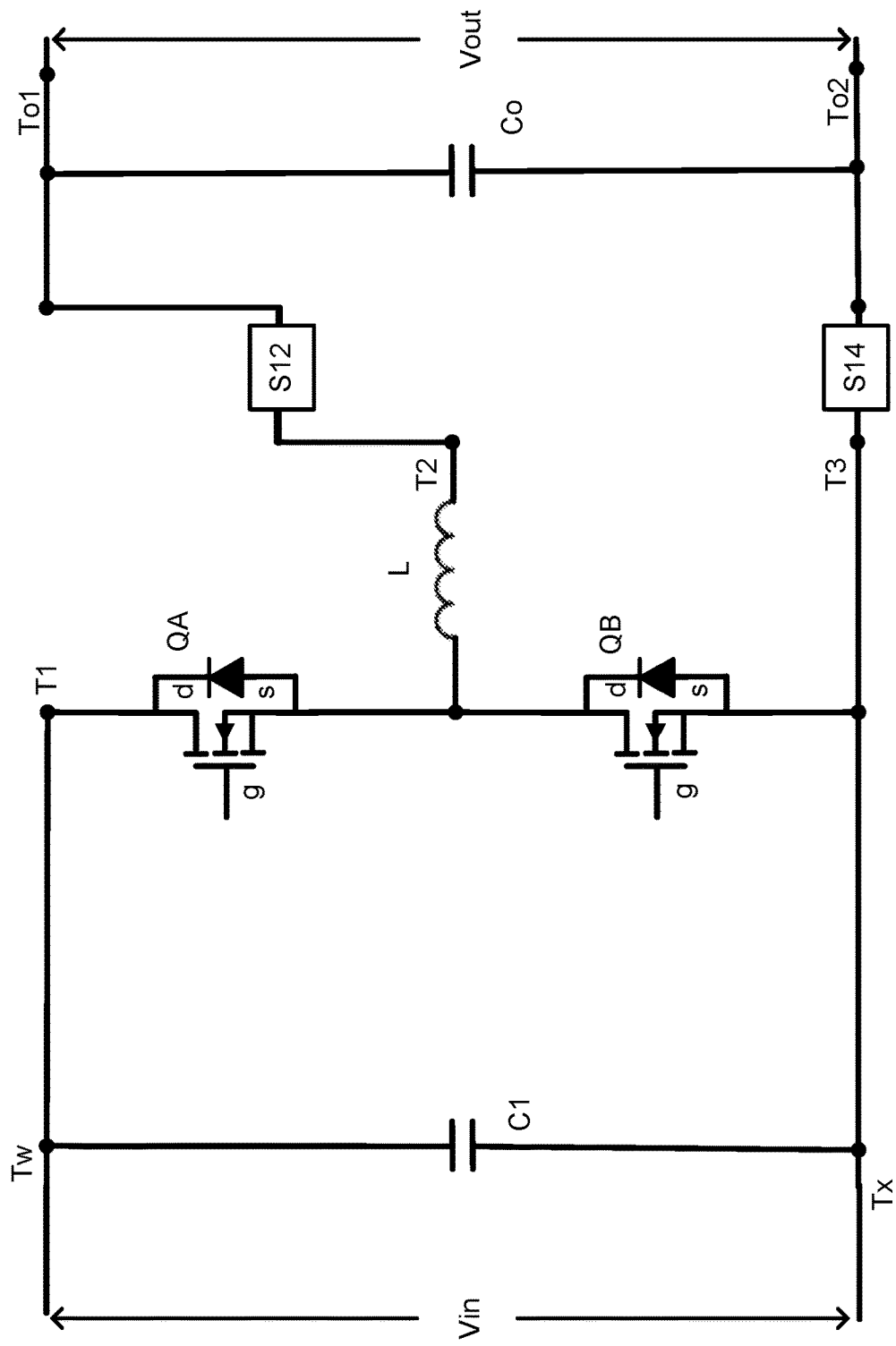
FIG. 13B shows the example power device of FIG. 13A in an upside-up buck configuration mode.

FIG. 13B shows an example power device 106-J in an upside-up buck configuration mode of operation. Switching element S11 may be turned OFF, which may create an open circuit configuration between the terminal of switch QA and output terminal To1. Switching element S13 may also be turned OFF, which may create an open circuit configuration between output terminal T2 and output terminal To2. Switching element S12 may be turned ON, which may create a short circuit configuration between output terminal T2 and output terminal To1 (e.g., symbolized by a line through switching element S12). Switching element S14 may be turned ON, which may create a short circuit configuration between output terminal T3 and output terminal To2 (e.g., symbolized by a line through switching element S14). Turning switching element S14 ON may directly connect negative input terminal Tx to negative output terminal To2 (e.g., via switching element S14). In such a case, the negative input terminal Tx may have substantially the same voltage as the negative output terminal To2. Power device 106-J may be in an upside-up buck configuration mode with an output voltage of Vout between output terminal To1 and output terminal To2.

Figure 13C:
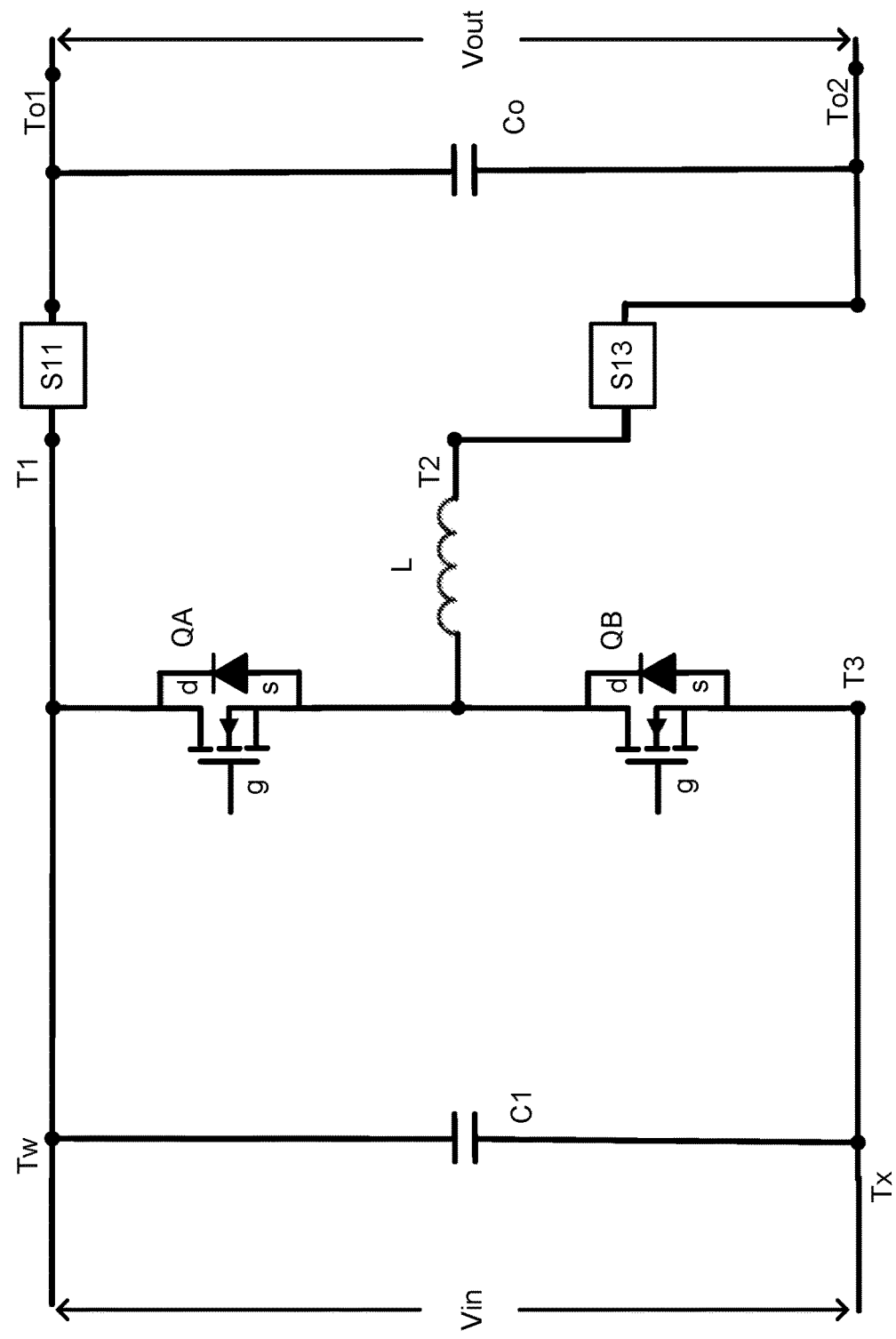
FIG. 13C shows the example power device of FIG. 13A in an upside-down buck configuration mode.

FIG. 13C shows an example power device 106-J in an upside-down buck configuration mode of operation. Switching element S11 may be turned ON, which may create a short circuit configuration between the terminal of switch QA and output terminal To1. Switching element S13 may also be turned ON, which may create a short circuit configuration between output terminal T2 and output terminal To2 (symbolized by a line through switching element S13). Switching element S12 may be turned OFF, which may create an open circuit configuration between output terminal T2 and output terminal To1. Switching element S14 may be turned OFF, which may create an open circuit configuration between output terminal T3 and output terminal To2. Turning switching element S11 ON may directly connect positive input terminal Tw to positive output terminal To1 (e.g., via switching element S11). In such a case, the positive input terminal Tw may have substantially the same voltage as the positive output terminal To1. Power device 106-J may be in an upside-down buck configuration mode with an output voltage of Vout between output terminal To1 and output terminal To2.

Figure 14:
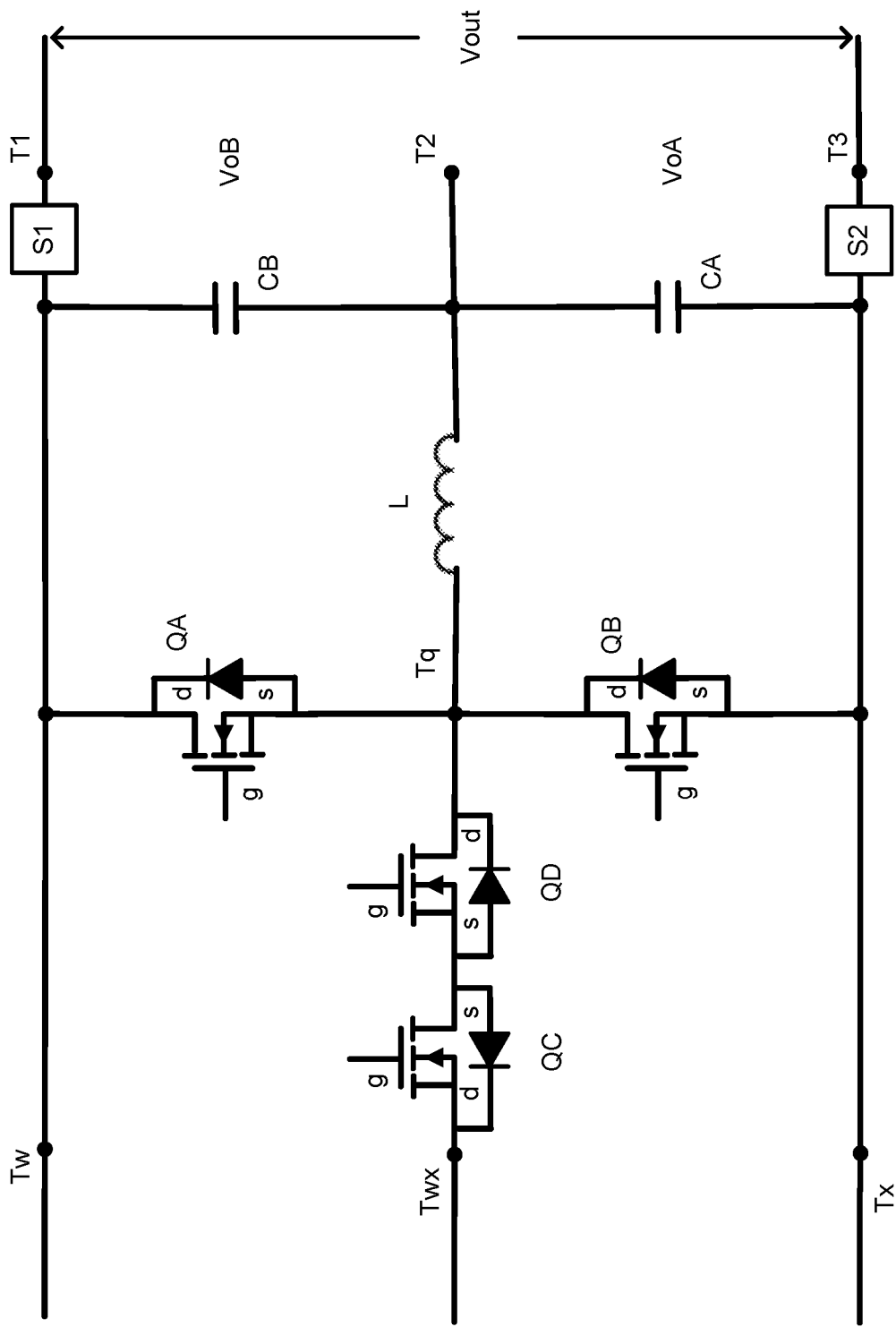
FIG. 14 shows an example power device with a plurality of modes of operation.

FIG. 14 shows an example power device 106-K. Power device 106-K may include additional switches QC and QD. Switch QC and switch QD may be connected as back to back transistors between an input terminal Twx and a terminal Tq (e.g., connected between a terminal of switch QA and a terminal of switch QB). Back to back transistors may be configured to provide some bi-directional functionalities in the power device 106-F. For example, where power source 102 is a storage device (e.g., power source 102 is a battery, and the load 112 is an electrical grid), power device 106 with bi-directional functionalities may be beneficial (e.g., by helping the grid with charging the battery via the power device 106).

Figure 15:
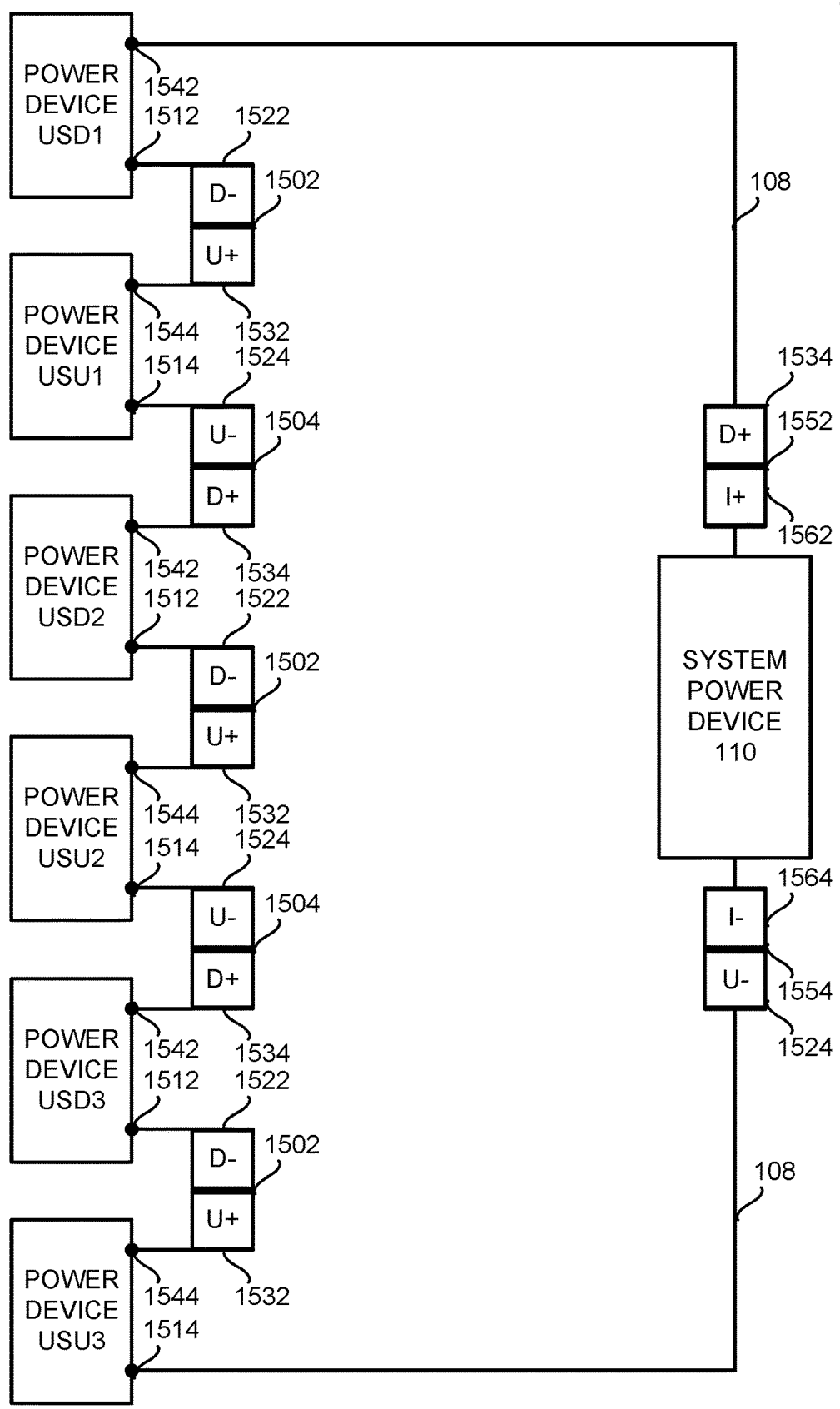
FIG. 15 shows an example power system.

FIG. 15 shows an example power system 100E. Power system 100E may include connectors 1502 and/or 1504, which may be configured to force the connection of a power device of one type to another power device of a different type. For example, connectors 1502 or 1504 may be configured to force the connection between an upside-up buck converter and an upside-down buck converter. Power systems may include a plurality of upside-up buck converters USU1, USU2, and/or USU3, and/or a plurality of upside-down buck converters USD1, USD2, and/or USD3. The plurality of upside-up buck converters USU1, USU2, and/or USU3, and/or the plurality of upside-down buck converters USD1, USD2, and/or USD3 may be connected to each other to form at least one series string. The plurality of upside-up buck converters USU1, USU2, and/or USU3, and/or the plurality of upside-down buck converters USD1, USD2, and/or USD3, may also be connected to system power device 110. Upside-down buck converter USD1 may be connected to the high side of DC bus 108 at the top of the series string. Upside-up buck converter USU3 may be connected to the low side of DC bus 108 at the bottom of the series string.

Connectors 1502 and/or 1504 may be configured to connect between a first terminal of a first converter and a first terminal of the second converter (e.g., without connecting to a second terminal of the first converter or a second terminal of the second converter). Connector 1502 may be configured to connect between the negative output terminal 1512 of an upside-down buck converter and the positive output terminal 1544 of an upside-up buck converter. Connector 1502 may be configured to not connect to the negative output terminal 1514 of an upside-up buck converter or to the positive output terminal 1542 of an upside-down buck converter. Connector 1504 may be configured to connect between the negative output terminal 1514 of an upside-up buck converter and the positive output terminal 1542 of an upside-down buck converter. Connector 1504 may be configured to not connect to the negative output terminal 1512 of an upside-down buck converter or to the positive output terminal 1544 of an upside-up buck converter.

Each of the connectors 1502 or 1504 may include a plurality of connector elements. Connector 1502 may include the connector element 1522 and the connector element 1532. Connector 1504 may include the connector element 1524 and the connector element 1534. A connector element may be a portion of a connector that may be arranged to enable a specific physical and electrical connection between one type of connector and another type of connector, which may have the advantage of establishing a connection between one type of converter and another type of converter (e.g., between an upside-up converter and an upside-down converter). Examples of various connector elements are provided below.

Each connector element may be configured to only connect to one other type of connector element (e.g., certain pairs of connecter elements may be mated to each other, and not to other connector elements). For example, connector element 1522 and connector element 1532 may be configured to only connect to each other and not connector element 1524 or connector element 1534. Connector element 1524 and connector element 1534 may be configured to only connect to each other and not connector element 1522 or connector element 1532. Each connector element may be attached via a conductor to a terminal of a respective power device that includes a converter. The conductor may be an electrical wire connected between an input terminal or an output terminal of the power device and the connector element (e.g. a plug or other appropriate element for electrical connection).

Each pair of connector elements 1522 and 1532, or 1524 and 1534, may have a specific configuration that forces the connection of the pairs of connector elements to each other and not to other types of connector elements. For example, the pair of connector elements may have a similar shape as each other, and may have a different shape than connector elements in a different pair. The shape of the connector elements may be any appropriate shape, for example: round, circular, rectangular, square, etc.

The pair of connector elements may also have matching connection elements for that pair. For example, each pair of connector elements may include matching male and female connection elements. The matching male and female connection elements may be arranged to connect with one another. For example, one of the connector elements may have a male connection element that fits inside a matching female connection element. The matching female connection element may be part of the other connector element of that pair. An example of a male connection element may be a protruding member or a plug. An example of a female connection element may be a recess or socket arranged to receive the male connection element. For example, the female connection element may include walls with a gap sized and shaped according to the male connection element (e.g., a member that may be placed inside the gap and held in place by the walls).

Referring to FIG. 15, the system power device 110 may be connected to the one or more power devices using connectors 1552 and 1554. Connector 1552 may include connector element 1534 and connector element 1562. Connector 1554 may include connector element 1564 and connector element 1524. Connector element 1562 may be configured to connect only to connector element 1534 and not other connector elements. Connector element 1562 may be the same as connector element 1504. Connector element 1564 may be configured to connect only to connector element 1524 and not other connector elements. Connector element 1564 may be the same as connector element 1534. Using these connectors 1552 and 1554 (e.g., with the connector elements 1562 and 1564) may determine the configuration of the power system 100E where an upside-down buck converter USD1 is connected to the high side of DC bus 108 at the positive input of the system power device 110, and an upside-up buck converter USU3 is connected to the low side of DC bus 108 at the negative input of the system power device 110. System power device 110 may include one or more other connectors and/or one or more other connector elements that determine other configurations of the power system. System power device 110 may include one or more "universal" connectors and/or one or more "universal" connector elements that do not determine a specific configuration of the power system (e.g., do not force a specific configuration or location of the system power device in the power system).

Figure 16:
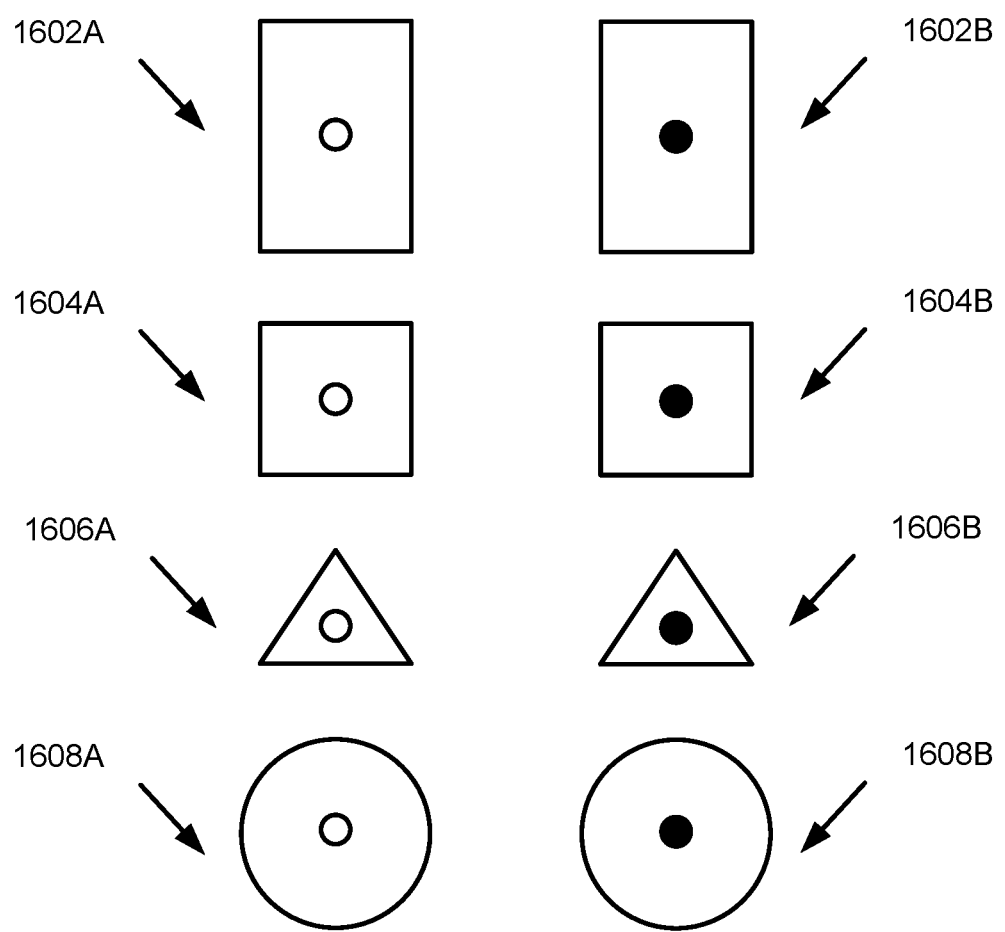
FIG. 16 shows example connectors.

FIG. 16 shows example connectors. Each connector may include a pair of connector elements with matching connection elements for that pair. For example, connector element 1602A may have a similar shape as connector element 1602B. Connector element 1602A may also have a connection gap that matches a connection member of connector element 1602B. This pair of connector elements 1602A-1602B may have a different shape than the other pairs of connector elements 1604A-1604B, 1606A-1606B, or 1608A-1608B. Connector 1502 may include a connector element 1522 that is similar to connector element 1602A, and/or a connector element 1532 that is similar to connection element 1602B. Connector 1504 may include a connector element 1524 that is similar to connector element 1604A, and/or a connector element 1534 that is similar to connector element 1604B. The configuration of the connectors may determine a configuration of the power system where the negative output of an upside-down buck converter may only be connected to the positive output of an upside-up buck converter, and/or the negative output of an upside-up buck converter may only be connected to the positive output of an upside-down buck converter. This configuration of a series string of alternating upside-down buck converters and upside-up buck converters may be shown in FIG. 15.

Figure 17:
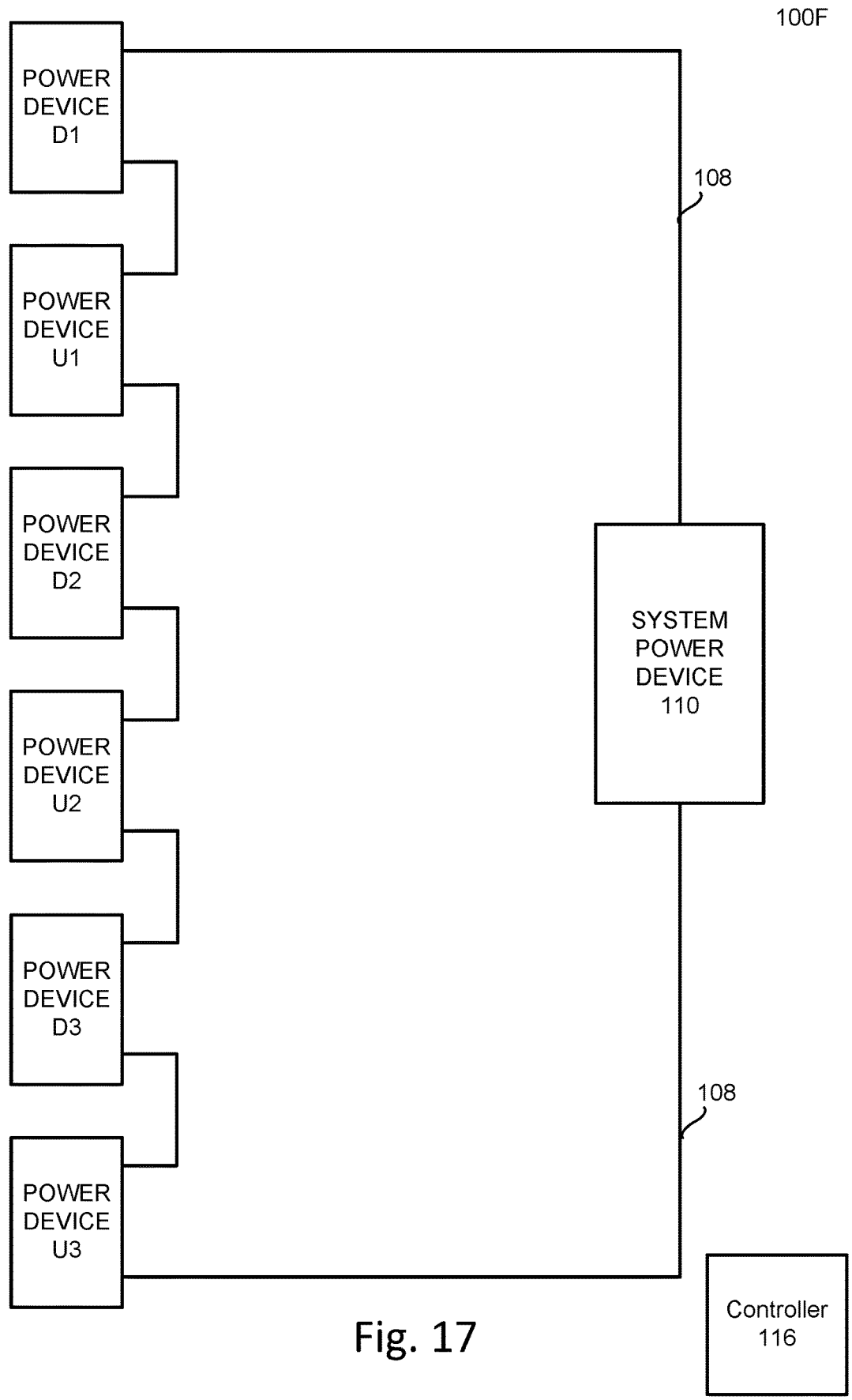
FIG. 17 shows an example power system.

FIG. 17 shows an example power system 100F. Power system 100F may be prewired (e.g., such that the negative output of an upside-down buck converter D1, D2, or D3 is connected to the positive output of an upside-up buck converter U1, U2, or U3, and/or such that the negative output of an upside-up buck converter U1, U2, or U3 is connected to the positive output of an upside-down buck converter D1, D2, or D3). The term "prewired" may refer to connecting a plurality of power devices to one another prior to deployment in the field. For example, the plurality of power devices may be prewired during manufacturing of the power devices. In some examples the plurality of power devices may be prewired as a series string of power device. Prewiring a series string or a plurality of series strings with alternating upside-down buck converters and upside-up buck converters may have the advantage of promoting easy installation of the power system and may increase the chance that that the power system 100F has an expected configuration.

Referring to FIG. 17, an upside-down buck converter D1 may be connected to the high side of DC bus 108 at the positive input of the system power device 110, and an upside-up buck converter U3 may be connected to the low side of DC bus 108 at the negative input of the system power device 110.

Figure 18A:
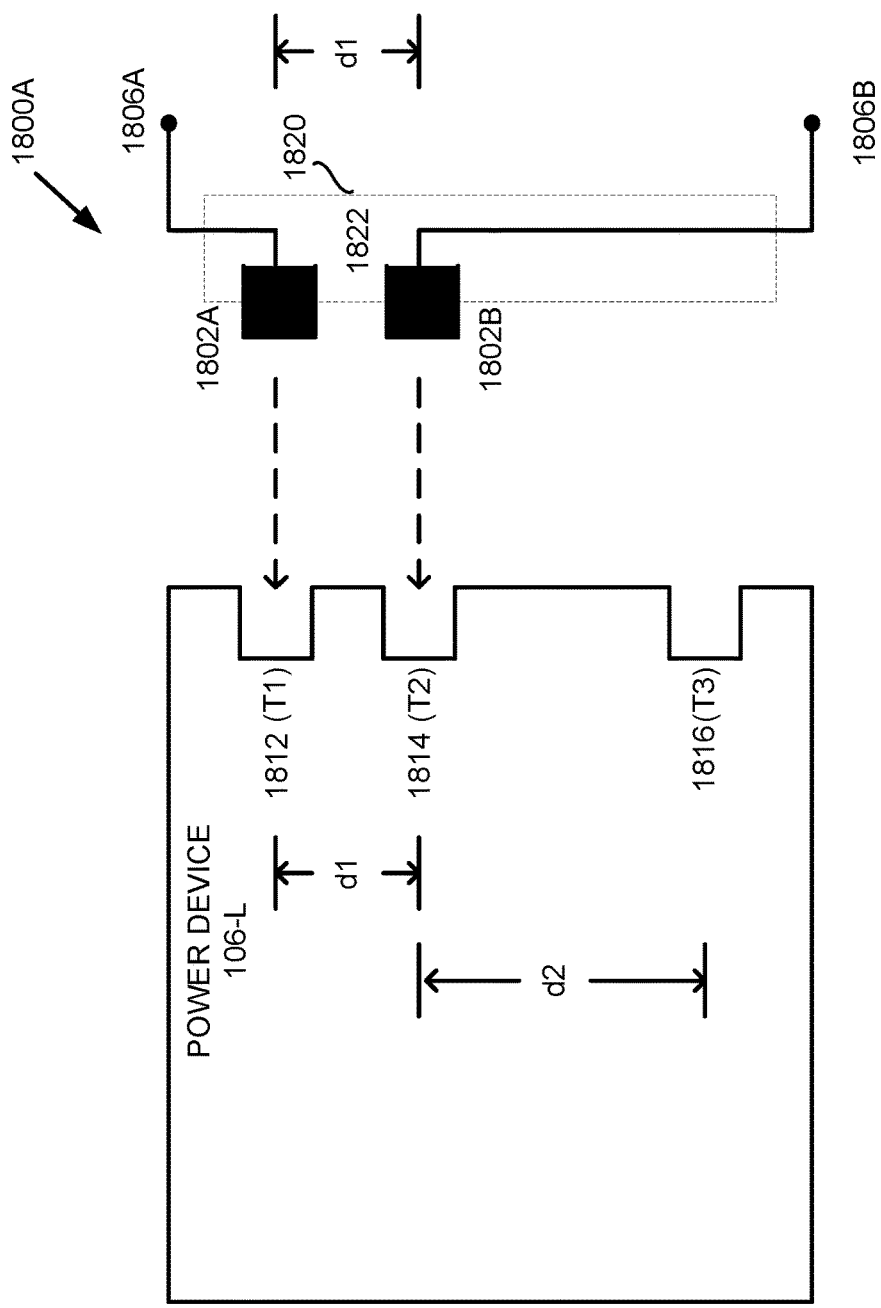
FIG. 18A shows an example apparatus.

FIG. 18A shows an example configuration device 1800A. Configuration device 1800A may be used to set a configuration of a power device. Power device 106-L may include a plurality of coupling elements 1812, 1814, and 1816. A first pair of the coupling elements 1812 and 1814 may be at a first distance d1 from one another. A second pair of the coupling elements 1814 and 1816 may be at a second distance d2 from one another. The coupling elements may correspond to a terminal of the power device. For example, coupling element 1812 may correspond to terminal T1 (e.g., as may be shown in FIG. 13A). Coupling element 1814 may correspond to terminal T2 (e.g., as may be shown in FIG. 13A). Coupling element 1816 may correspond to terminal T3 (e.g., as may be shown in FIG. 13A).

Configuration device 1800A may include a pair of coupling elements 1802A and 1802B, which may be at a distance d1 from one another. Coupling elements 1802A and 1802B may be configured to connect to the corresponding pair of coupling elements 1812 and 1814 on power device 106-L. Coupling elements 1812 and 1814 may be at a distance d1 from one another. Configuration device 1800A may include one or more output terminals 1806A or 1806B, which may be configured to connect the power device 106-L to one or more additional electrical elements via the configuration device 1800A. Configuration device 1800A may include a housing 1820 configured to house a wiring arrangement 1822 of the configuration device 1800A. The wiring arrangement 1822 may be configured such that coupling element 1802A may be connected to output terminal 1806A and coupling element 1802B may be connected to output terminal 1806B. Output terminal 1806A may be a positive output terminal that may be configured to connect to a negative output terminal of a different power device (e.g., in a series string of power devices) or to the DC bus. Output terminal 1806B may be a negative output terminal that may be configured to connect to connect to a positive output terminal of a different power device (e.g., in a series string of power devices) or to the DC bus.

Connecting coupling elements 1802A and 1802B of configuration device 1800A to coupling elements 1812 and 1814 of the power device 106-L may set the configuration of power device 106-L in a certain configuration mode. The configuration mode of the power device may include an upside-up configuration mode (e.g., upside-up buck) or an upside-down configuration mode (e.g., upside-down buck). As an example, connecting coupling elements 1802A of configuration device 1800A to coupling element 1812 of the power device 106-L may connect terminal T1 to a positive output terminal 1806A, which may directly connect a positive input terminal Tw of the power device 106-L to the positive output terminal of the power device. This may result in the power device 106-L being set in an upside-down configuration mode (e.g., as may be shown in FIG. 13C). Connecting coupling element 1802B of configuration device 1800A to coupling element 1814 of the power device 106-L may connect terminal T2 to a negative output terminal 1806B (e.g., as may be shown in FIG. 13C).

Figure 18B:
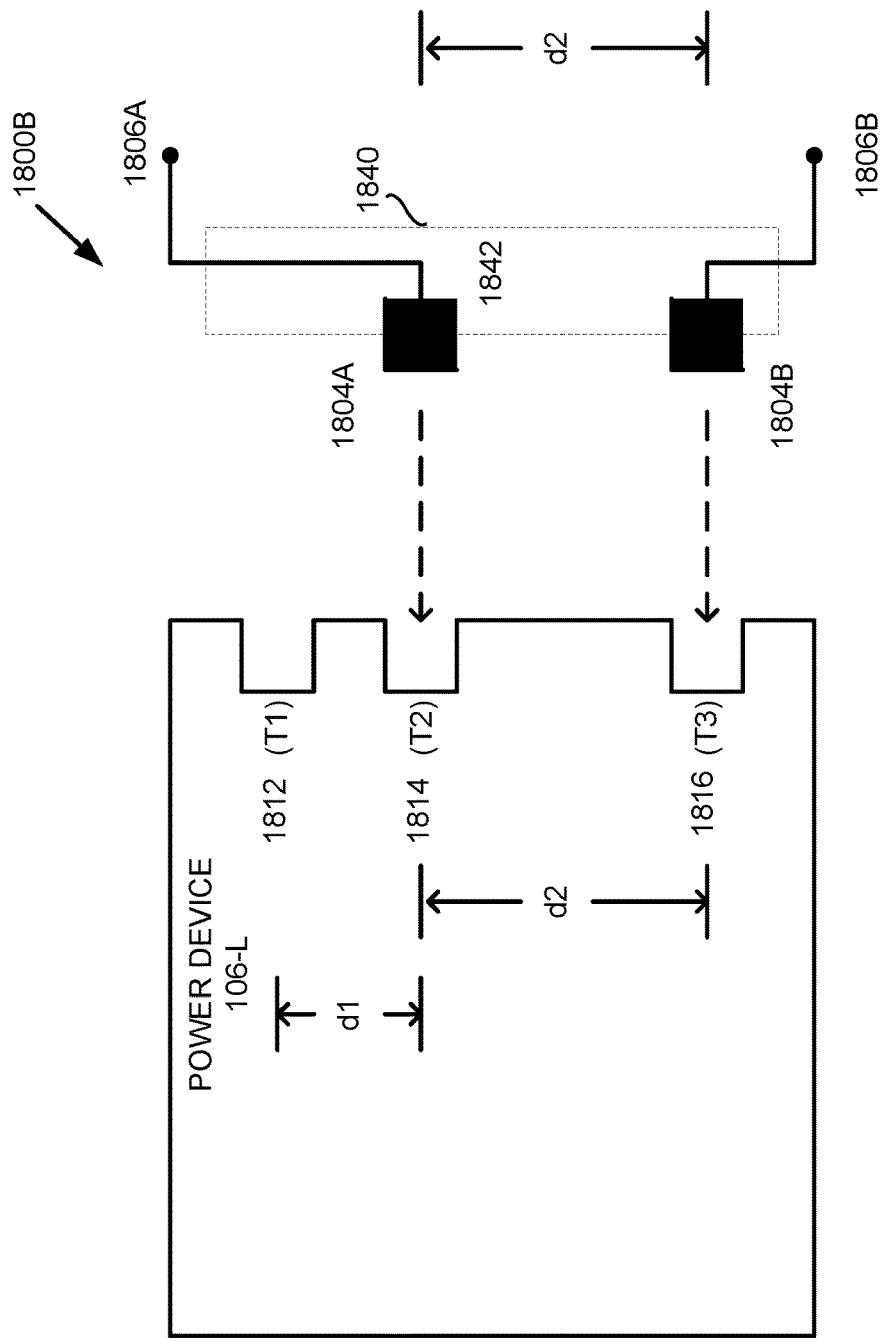
FIG. 18B shows an example apparatus.

FIG. 18B shows an example configuration device 1800B. Configuration device 1800B may be used to set a configuration of a power device. Configuration device 1800B may include a pair of coupling elements 1804A and 1804B, which may be at a distance d2 from one another. Coupling elements 1804A and 1804B may be configured to connect to a corresponding pair of coupling elements 1814 and 1816 on power device 106-L. Coupling elements 1814 and 1816 may be at a distance d2 from one another. Configuration device 1800B may include one or more output terminals 1806A and 1806B, which may be configured to connect the power device 106-L to one or more additional electrical elements via the configuration device 1800B. Configuration device 1800B may include a housing 1840 configured to house a wiring arrangement 1842 of the configuration device 1800B. For example, the wiring arrangement 1842 may be configured such that coupling element 1804A may be connected to output terminal 1806A and coupling element 1804B may be connected to output terminal 1806B. Output terminal 1806A may be a positive output terminal that may be configured to connect to a negative output terminal of a different power device (e.g., in a series string of power devices) or to the DC bus. Output terminal 1806B may be a negative output terminal that may be configured to connect to a positive output terminal of a different power device (e.g., in a series string of power devices) or to the DC bus.

Connecting coupling elements 1804A and 1804B of configuration device 1800B to coupling elements 1814 of 1816 of the power device 106-L may set the configuration of power device 106-L in a certain configuration mode. The configuration mode of the power device may include an upside-up configuration mode (e.g., upside-up buck) or an upside-down configuration mode (e.g., upside-down buck). Connecting coupling element 1804A of configuration device 1800B to coupling element 1814 of the power device 106-L may connect terminal T2 to a positive output terminal 1806A (e.g., as may be shown in FIG. 13B). Connecting coupling element 1804B of configuration device 1800B to coupling elements 1816 of the power device 106-L may connect terminal T3 to a negative output terminal 1806B, which may directly connect a negative input terminal Tx of the power device 106-L to the negative output terminal of the power device. This may result in setting the power device 106-L in an upside-up configuration mode (e.g., as may be shown in FIG. 13B).

The configuration mode set by connecting configuration device 1800B to power device 106-L may be different than the configuration mode set by connecting configuration device 1800A to power device 106-L. For example, connecting configuration device 1800A to power device 106-L may set the configuration of power device 106-L in a first configuration mode (e.g., upside-up mode or upside-down mode). Connecting configuration device 1800B to the power device 106-L may set the configuration of power device 106-L in a second, different configuration mode (e.g., upside-down mode or upside-up mode). For example, power devices 106CA-106CD shown in FIG. 7B may be set in an upside-down buck configuration (with terminal Tw directly connected to terminal Ty) by using configuration device 1800A. Power devices 106CE-106CG shown in FIG. 7B may be set in an upside-up buck configuration (with terminal Tx directly connected to terminal Tz) by using configuration device 1800B.

Figure 19A:
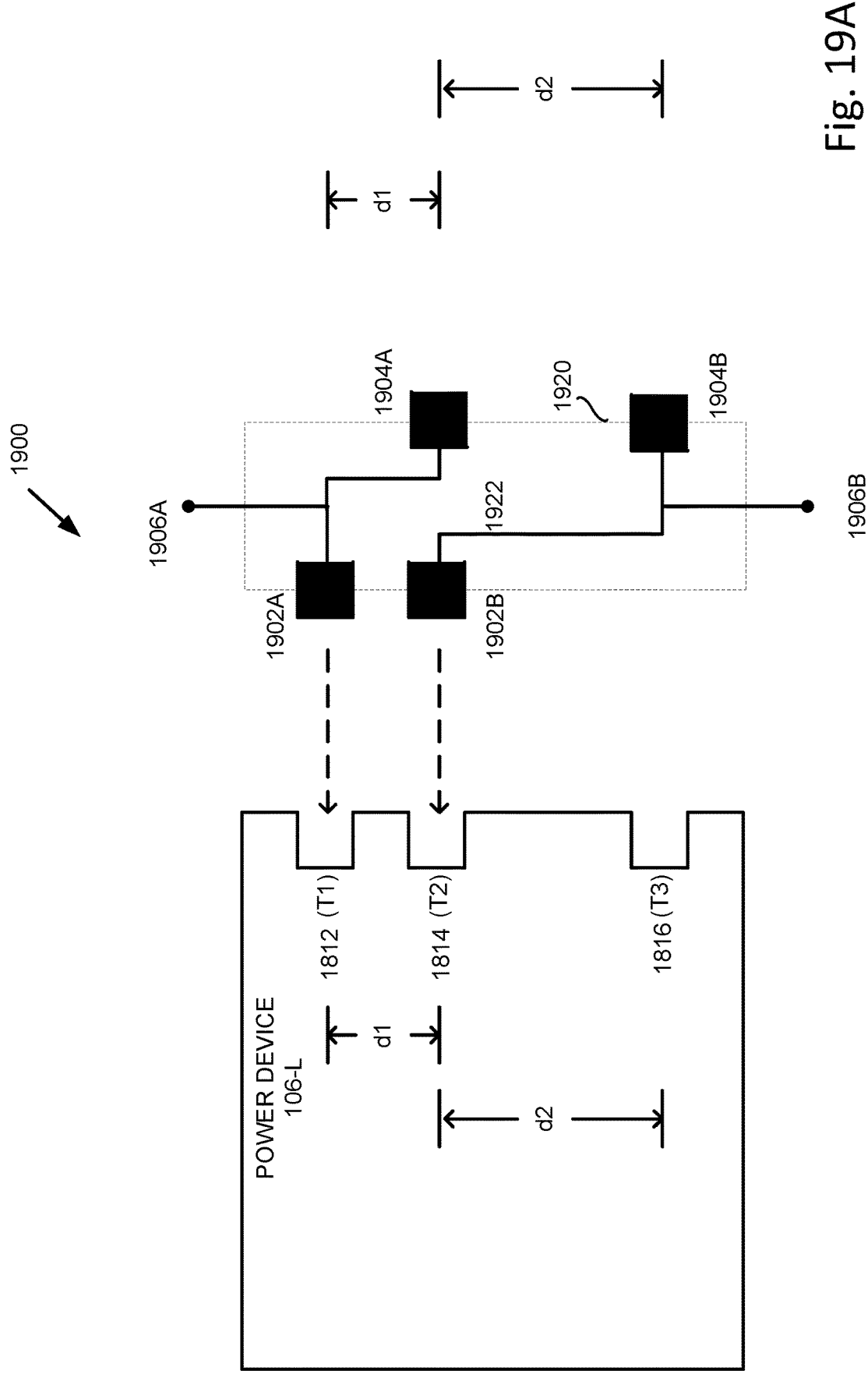
FIG. 19A shows an example apparatus.
Figure 19B:
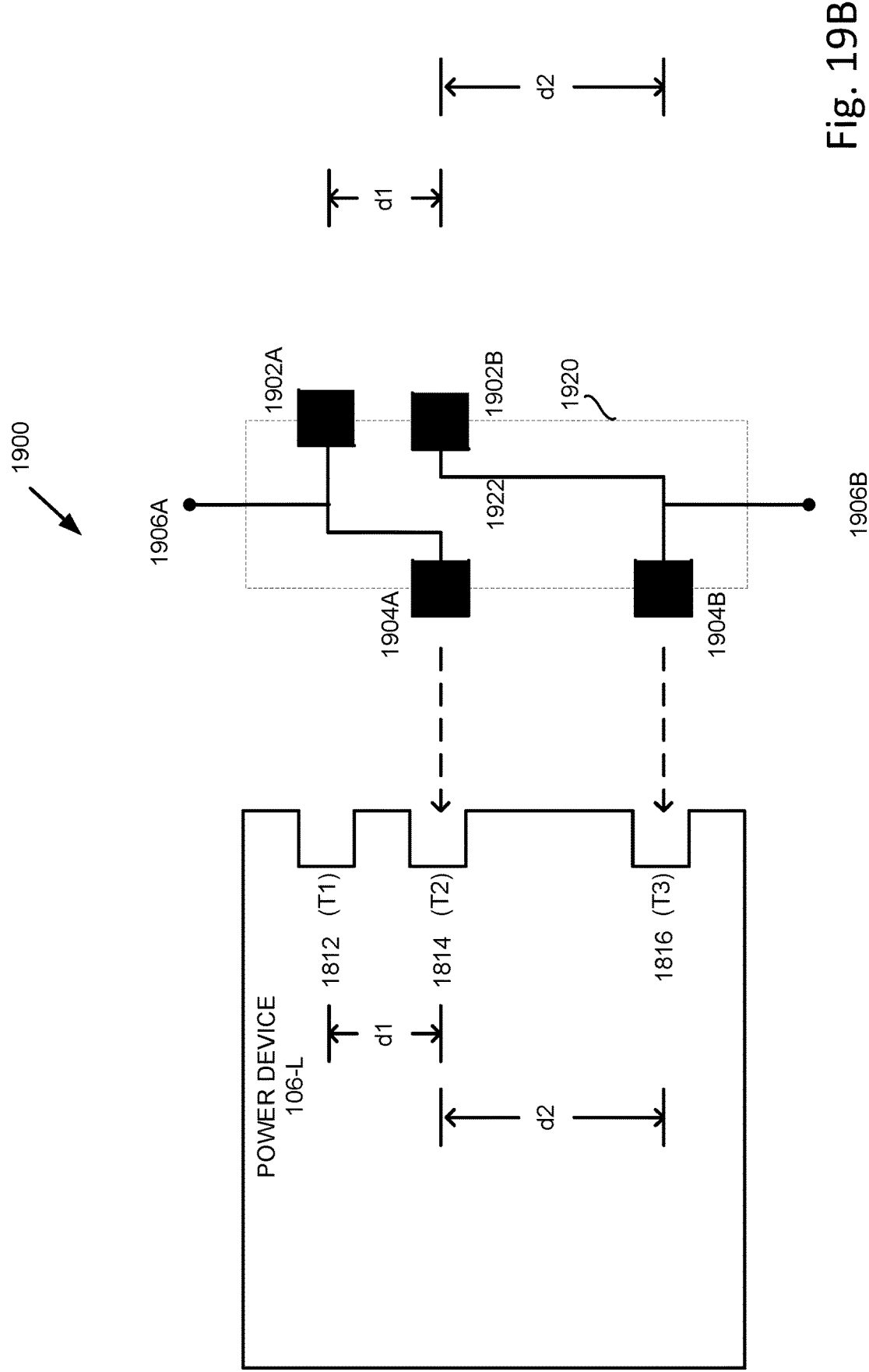
FIG. 19B shows an example apparatus.

FIG. 19A and FIG. 19B show an example configuration device 1900. Configuration device 1900 may be used to set a configuration of a power device depending on how the configuration device 1900 is connected to the power device. For example, if the configuration device 1900 is connected to the power device 106 in a first way then the power device 106 may be configured in a first mode of operation. If the configuration device 1900 is connected to the power device 106 in a second way then the power device may be configured in a second, different mode of operation.

Configuration device 1900 may include a first pair of coupling elements 1902A and 1902B, which may be at a first distance d1 from one another. Configuration device 1900 may include a second pair of coupling elements 1904A and 1904B, which may be at a second distance d2 from one another. Coupling elements 1902A and 1902B may be configured to connect to a corresponding pair of coupling elements 1812 and 1814 on power device 106-L. A corresponding pair of coupling elements 1812 and 1814 may be at a distance d1 from one another. Coupling elements 1904A, 1904B may be configured to connect to a second corresponding pair of coupling elements 1814 and 1816 on power device 106-L. The corresponding pair of coupling elements 1814 and 1816 may be at a distance d2 from one another. Configuration device 1900 may include one or more output terminals 1906A and 1906B configured to connect the power device 106-L to one or more additional electrical elements via the configuration device 1900. Configuration device 1900 may include a housing 1920 configured to house a wiring arrangement 1922 of the configuration device 1900. The wiring arrangement 1922 may be configured so that coupling element 1902A and coupling element 1904A are connected to output terminal 1906A. The wiring arrangement 1922 may also be configured so that coupling element 1902B and coupling element 1904B are connected to output terminal 1906B. Output terminal 1906A may be a positive output terminal that may be configured to connect to a negative output terminal of a different power device (e.g., in a series string of power devices) or to the DC bus. Output terminal 1906B may be a negative output terminal that may be configured to connect to connect to a positive output terminal of a different power device (e.g., in a series string of power devices) or to the DC bus.

Connecting coupling elements 1902A and 1902B to the power device 106-L (e.g., as may be shown in FIG. 19A) may set the configuration of power device 106-L in a first configuration mode (e.g., as may be shown in FIG. 18A). Connecting coupling elements 1904A and 1904B to the power device 106-L (e.g., as may be shown in FIG. 19B) may set the configuration of power device 106-L in a second configuration mode (e.g., as may be shown in FIG. 18B). The different configuration modes of the power device may include an upside-up configuration mode (e.g., upside-up buck) and an upside-down configuration mode (e.g., upside-down buck).

It will be appreciated that other configuration devices are possible to help ensure certain connections in the power system. For example, a configuration device may include a first side having a single prong that is used to set a first configuration mode of a power device and a second side having two prongs that are used to set a second configuration mode of a power device.

Figure 20:
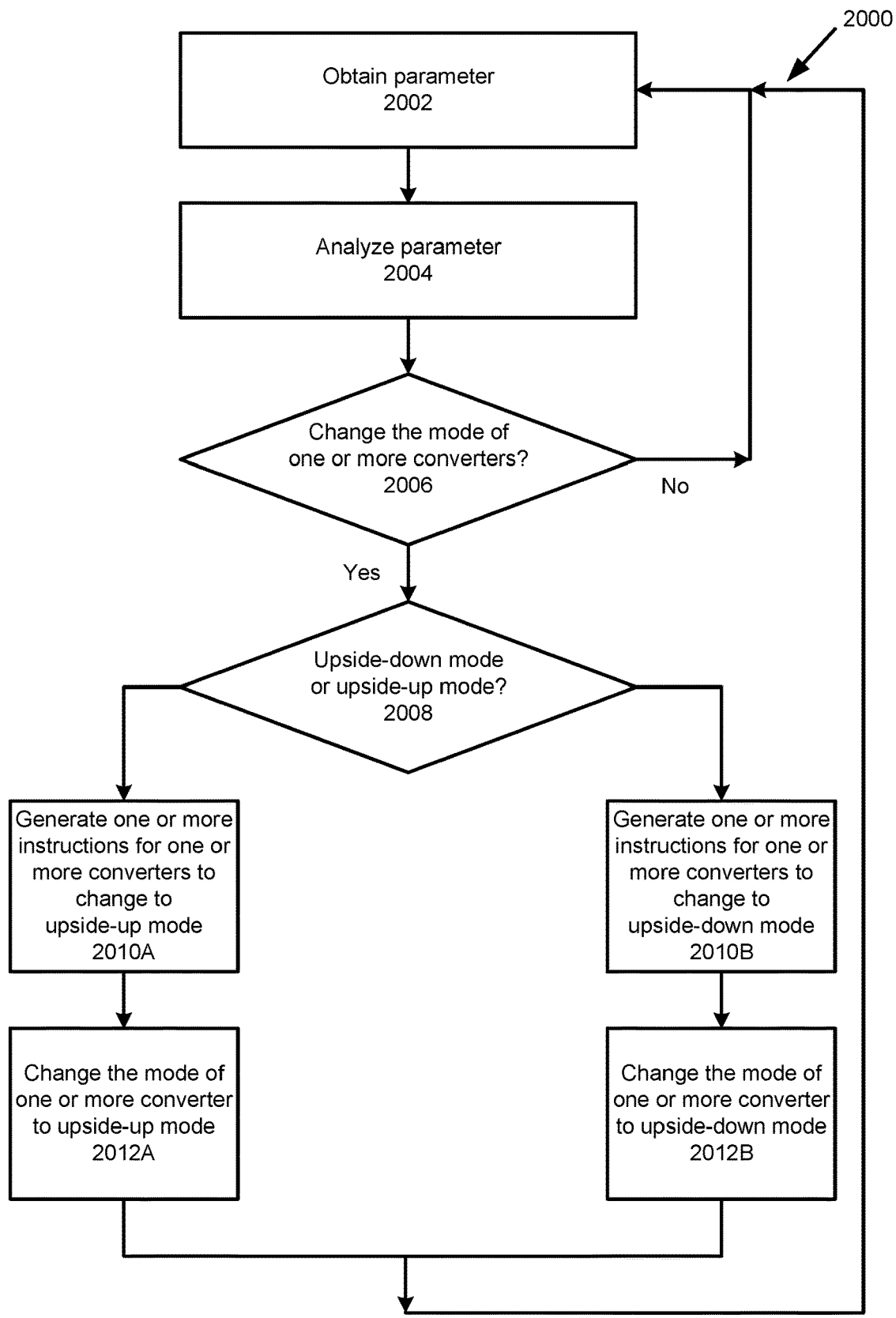
FIG. 20 shows an example flow chart of a method.

FIG. 20 shows an example flow chart 2000 of a method for controlling changing modes for one or more converters.

In step 2002, a parameter may be obtained. This step may be performed using one or more power devices 106 and/or one or more controllers 116 of the power system 100. The parameter may relate to an operational state of one or more power devices 106 of the power system 100. For example, the one or more sensors may be configured to detect a physical phenomenon related to one or more elements of the power system 100 and determine a digital value or parameter representing the intensity of the phenomenon. The value or parameter may be transmitted to one or more controllers 116. In some examples, the value or parameter may be further processed (e.g., into parameter data). These value or parameter may be an electrical parameter, such as a: current, voltage, power, temperature, irradiance, etc.

In step 2004, the parameter may be analyzed. This step may be performed using one or more power devices 106 and/or one or more controllers 116 of the power system 100. For example, the one or more controllers 116 may analyze one or more parameters in order to determine if a voltage of the power system 100 is above or below a known threshold voltage for the power system 100. As another example, the one or more controllers 116 may analyze one or more parameters to determine an operational state of one or more of the power devices 106. The results of the analysis may be used in the following step to help determine whether the mode of operation of one or more of the converters is to be changed.

In step 2006, a decision may be made whether the mode of operation of one or more of the converters is to be changed. This step may be performed using one or more power devices 106 and/or one or more controllers 116 of the power system 100. For example, the one or more controllers 116 may determine that a voltage of the power system 100 should be lowered by switching a converter that is connected to the high side of a DC bus to an upside-down mode. As another example, the one or more controllers 116 may determine that one or more converters have been bypassed and the mode of operation of one or more other converters should be changed from upside-down mode to upside-up mode to ensure that an upside-up converter is connected to the low side of the DC bus. As another example, the one or more controllers 116 may determine that one or more converters have been bypassed and the mode of operation of one or more other converters should be changed to maintain a specific ratio of upside-down converters to upside-up converters.

If in step 2006 the decision is that the mode of operation of one or more of the converters is not to be changed, then the process 2000 may return to step 2002.

If in step 2006 the decision is that the mode of operation of one or more of the converters is to be changed, then the process 2000 may proceed to step 2008.

In step 2008, a decision may be made regarding which of the converters is to be changed to upside-down mode or to upside-up mode. This step may be performed using one or more power devices 106 and/or one or more controllers 116 of the power system 100. In some examples, this step may be performed at an initialization of the power system 100. For example, the one or more controllers 116 may be initially in neither mode of operation, and this step may be used to determine which of the converters should start out in which mode of operation. This step may also include a determination whether the converter is to be switched reversibly or irreversibly into the determined mode of operation. Alternatively, this step may be performed after the mode of operation has been determined for the plurality of converters, and this step may be used to determine which of the converters should change their mode of operation from a different mode of operation (e.g., from upside-up to upside-down, or from upside-down to upside-up). Some examples of power devices 106 that may be configured to change modes of operation are detailed above with regards to FIG. 8A to FIG. 14.

If in step 2008 the decision is that the mode of operation of one or more of the converters is to be changed to upside-up mode, then the process 2000 may proceed to step 2010A.

In step 2010A, one or more instructions are generated to switch one or more of the converters to upside-up mode.

This step may be performed using one or more power devices 106 and/or one or more controllers 116 of the power system 100. For example, the one or more instructions may be generated to control one or more switching elements of one or more converters. The instructions may be generated to instruct the one or more switching elements to connect a negative input terminal of the converter to a negative output terminal of the converter.

In step 2012A, the mode of operation of one or more of the converters may be changed to upside-up mode. This step may be performed using one or more power devices 106 and/or controllers 116 of the power system 100. For example, the one or more power devices may obtain one or more signals from the one or more controllers 116, wherein the one or more signals may comprise instructions to change the mode of operation of the one or more converters to an upside-up mode. The one or more power devices 106 may have one or more switching elements that are configured to change the mode of operation of the one or more converters accordingly. For example, the one or more switching elements may be configured to change the one or more converters to an upside-up buck configuration mode by connecting a negative input terminal of the converter to a negative output terminal of the converter.

If in step 2008 the decision is that the mode of operation of one or more of the converters is to be changed to upside-down mode, then the process 2000 may proceed to step 2010B.

In step 2010B, one or more instructions are generated to switch one or more of the converters to upside-down mode. This step may be performed using one or more power devices 106 and/or one or more controllers 116 of the power system 100. For example, the one or more instructions may be generated to control one or more switching elements of one or more converters. The instructions may be generated to instruct the one or more switching elements to connect a positive input terminal of the converter to a positive output terminal of the converter.

In step 2012B, the mode of operation of one or more of the converters may be changed to upside-down mode. This step may be performed using one or more power devices 106 and/or controllers 116 of the power system 100. For example, the one or more power devices may obtain one or more signals from the one or more controllers 116, wherein the one or more signals may comprise instructions to change the mode of operation of the one or more converters to an upside-down mode. The one or more power devices 106 may have one or more switching elements that are configured to change the mode of operation of the one or more converters accordingly. For example, the one or more switching elements may be configured to change the one or more converters to an upside-down buck configuration mode by connecting a positive input terminal of the converter to a positive output terminal of the converter.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. An apparatus comprising:
    a direct current (DC) to DC converter, wherein the DC to DC converter comprises:
        a plurality of input terminals comprising:
            a first input terminal; and
            a second input terminal;
        an negative output terminal; and
        a plurality of switches comprising:
            a first switch connected to the first input terminal;
            a second switch connected to the first switch and the output terminal;
            a third switch connected to the second input terminal; and
            a fourth switch connected to the third switch and the output terminal,
    wherein the DC to DC converter is configurable to switch between operating in an upside-up buck mode of operation and in an upside-down buck mode of operation,
    wherein, in the upside-up buck mode of operation, the third switch and the fourth switch are controlled to be on to connect the second input terminal of the DC to DC converter to the output terminal of the DC to DC converter, and the second input terminal of the DC to DC converter has substantially a same voltage as the output terminal of the DC to DC converter, and
    wherein, in the upside-down buck mode of operation, the first switch and the second switch are controlled to be on to connect the first input terminal of the DC to DC converter to the output terminal of the DC to DC converter, and the first input terminal of the DC to DC converter has substantially the same voltage as the output terminal of the DC to DC converter.

2. The apparatus of claim 1, wherein the DC to DC converter is configured to selectively operate responsive to one or more signals comprising one or more instructions.

3. The apparatus of claim 2, wherein the one or more signals are related to a threshold value.

4. The apparatus of claim 2, wherein the apparatus further comprises a second DC to DC converter, and wherein the one or more signals are related to an operational state of the second DC to DC converter.

5. The apparatus of claim 4, wherein the operational state is indicative of a non-functioning state of the second DC to DC converter.

6. The apparatus of claim 4, wherein the operational state is indicative of the second DC to DC converter being in the upside-up buck mode of operation or the upside-down buck mode of operation.

7. The apparatus of claim 1, wherein the apparatus further comprises a second DC to DC converter, wherein the DC to DC converter is configured to operate in the upside-down buck mode of operation, wherein the second DC to DC converter is connected in series to the DC to DC converter, and wherein the second DC to DC converter is configured to operate in the upside-up buck mode of operation.

8. The apparatus of claim 1, further comprising one or more power sources.

9. The apparatus of claim 1, further comprising one or more system power devices.

10. The apparatus of claim 1, wherein the DC to DC converter is configurable to change modes of operation from at least one of: the upside-up buck mode of operation to the upside-down buck mode of operation, or the upside-down buck mode of operation to the upside-up buck mode of operation.

11. The apparatus of claim 10, wherein the DC to DC converter is configured to change between the upside-up buck mode of operation and the upside-down buck mode of operation in response to one or more parameters.

12. The apparatus of claim 1, wherein the DC to DC converter is configured to be permanently set in the upside-up buck mode of operation or the upside-down buck mode of operation.

13. The apparatus of claim 1, wherein the apparatus further comprises a capacitor connected between the first input terminal and the second input terminal.

14. The apparatus of claim 1, wherein the apparatus further comprises a second output terminal.

15. The apparatus of claim 14, wherein the apparatus further comprises a first capacitor connected between the output terminal and the second output terminal.

16. The apparatus of claim 14, wherein the apparatus further comprises an inductor connected to the second output terminal.

17. The apparatus of claim 14, wherein the apparatus further comprises a third output terminal.

18. The apparatus of claim 17, wherein the apparatus further comprises a first inductor connected to the second output terminal, and a second inductor connected to the third output terminal.

19. The apparatus of claim 17, wherein the apparatus further comprises a second capacitor connected to the second output terminal, and the second capacitor connected to the third output terminal.

20. A method comprising:
connecting, via a first pair of switches, a positive input terminal of a converter to an output terminal of the converter in an upside-down buck mode of operation;
connecting, via a second pair of switches, a negative input terminal of the converter to the output terminal of the converter in an upside-up buck mode of operation; and
controlling the first pair of switches and the second pair of switches to switch the converter between the upside-up buck mode of operation and the upside-down buck mode of operation, wherein in the upside-up buck mode of operation, the negative input terminal of the converter has substantially a same voltage as the output terminal of the converter, and wherein in the upside-down buck mode of operation, the positive input terminal of the converter has substantially the same voltage as the output terminal of the converter.

* * * * *